United States Patent
Akl et al.

(10) Patent No.: US 11,528,654 B2
(45) Date of Patent: Dec. 13, 2022

(54) TRANSPORT LAYER SEPARATION IN AN INTEGRATED ACCESS AND BACKHAUL NETWORK

(71) Applicant: QUALCOMM Incorporated, San Diego, CA (US)

(72) Inventors: Naeem Akl, Somerville, NJ (US); Karl Georg Hampel, Hoboken, NJ (US); Ozcan Ozturk, San Diego, CA (US); Luis Fernando Brisson Lopes, Swindon (GB); Navid Abedini, Basking Ridge, NJ (US); Jianghong Luo, Skillman, NJ (US); Luca Blessent, Whitehouse Station, NJ (US); Junyi Li, Fairless Hills, PA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 6 days.

(21) Appl. No.: 17/343,487

(22) Filed: Jun. 9, 2021

(65) Prior Publication Data

US 2021/0392565 A1     Dec. 16, 2021

Related U.S. Application Data

(60) Provisional application No. 63/037,853, filed on Jun. 11, 2020.

(51) Int. Cl.
*H04W 40/24* (2009.01)
*H04W 40/02* (2009.01)
*H04L 45/74* (2022.01)

(52) U.S. Cl.
CPC ........... *H04W 40/248* (2013.01); *H04L 45/74* (2013.01); *H04W 40/02* (2013.01)

(58) Field of Classification Search
None
See application file for complete search history.

(56) References Cited

U.S. PATENT DOCUMENTS

| 2019/0289492 A1* | 9/2019 | Hampel | H04B 7/15542 |
| 2020/0015147 A1* | 1/2020 | Malkamaki | H04W 40/36 |
| 2020/0100124 A1* | 3/2020 | Hampel | H04W 24/04 |

OTHER PUBLICATIONS

AT&T: "Multi-Connectivity Architecture Design for IAB Arch. 1a", 3GPP Draft, 3GPP TSG-RAN WG3 Meeting #101, R3-185153, 3rd Generation Partnership Project (3GPP), Mobile Competence Centre, 650, Route Des Lucioles, F-06921 Sophia-Antipolis Cedex, France, vol. RAN WG3, No. Gothenburg, Sweden, Aug. 20, 2018-Aug. 24, 2018, Aug. 28, 2018, XP051528482, 17 Pages, Retrieved from the Internet: URL: http://www.3gpp.org/ftp/tsg%5Fran/WG3%5Flu/TSGR3%5F101/Docs/R3%2D185153%2Ezip [retrieved on Aug. 28, 2018] paragraphs [0002], [02.1], [8.2.2], [09.2]; figures 9.2.2, 9.2.3.

(Continued)

*Primary Examiner* — Brian S Roberts
(74) *Attorney, Agent, or Firm* — Harrity & Harrity, LLP

(57) ABSTRACT

Various aspects of the present disclosure generally relate to wireless communication. In some aspects, a parent node may configure first and second backhaul radio link control (RLC) channels based on requests received from a first integrated access and backhaul (IAB) donor central unit (CU) and a second IAB donor CU, respectively. The parent node may select first and second logical channel identifiers for the first and second backhaul RLC channels, the second logical channel identifier being different from the first logical channel identifier, and may provide the first and second logical channel identifiers to the first IAB donor CU and the second IAB donor CU, respectively. The parent node may receive a packet including either the first logical channel identifier or the second logical channel identifier, and pro- (Continued)

cess the packet based on which of the first and second logical channel identifiers is included in the packet. Other aspects are provided.

30 Claims, 11 Drawing Sheets

(56) References Cited

OTHER PUBLICATIONS

Huawei: "BL CR to 38.401 Support for IAB", 3GPP Draft, 3GPP TSG RAN WG3 Meeting #106, R3-197808, 3rd Generation Partnership Project (3GPP), Mobile Competence Centre, 650, Route Des Lucioles, F-06921 Sophia-Antipolis Cedex, France, vol. RAN WG3, No. Reno, NV, USA, Nov. 18, 2019-Nov. 22, 2019 Jan. 20, 2020 (Jan. 20, 2020), XP051844689, 17 Pages, Retrieved from the Internet: URL:https://ftp.3gpp.org/tsg_ran/WG3_lu/TSGR3_106/Docs/R3-197808.zip R3-197808-BL CR to 38.401 Support for IAB.doc [retrieved on Jan. 20, 2020] p. 10-p. 12, figures 8.2.y-1, 8.2.y.1, p. 7, figures 6.1.y-2.

International Search Report and Written Opinion—PCT/US2021/036843—ISA/EPO—dated Oct. 14, 2021.

Qualcomm Incorporated: "(TP for NR IAB BL CR to TS 38.401) Intra-CU Topological Redundancy Procedure", 3GPP Draft, 3GPP TSG-RAN WG3 Meeting #106, R3-196781, 3rd Generation Partnership Project (3GPP), Mobile Competence Centre, 650, Route Des Lucioles, F-06921 Sophia-Antipolis Cedex, France, vol. Ran WG3, No. Reno, Nevada, USA, Nov. 18, 2019-Nov. 22, 2019 Nov. 8, 2019 (Nov. 8, 2019), XP051820521, 4 Pages, Retrieved from the Internet: URL:https://ftp.3gpp.org/tsg_ran/WG3_lu/TSGR3_106/Docs/R3-196781.zip R3-196781 (TP for-NR IAB BL CR to 38.401) Intra-CU Topological Redundancy Procedure.doc [retrieved on Nov. 8, 2019] the whole document.

* cited by examiner

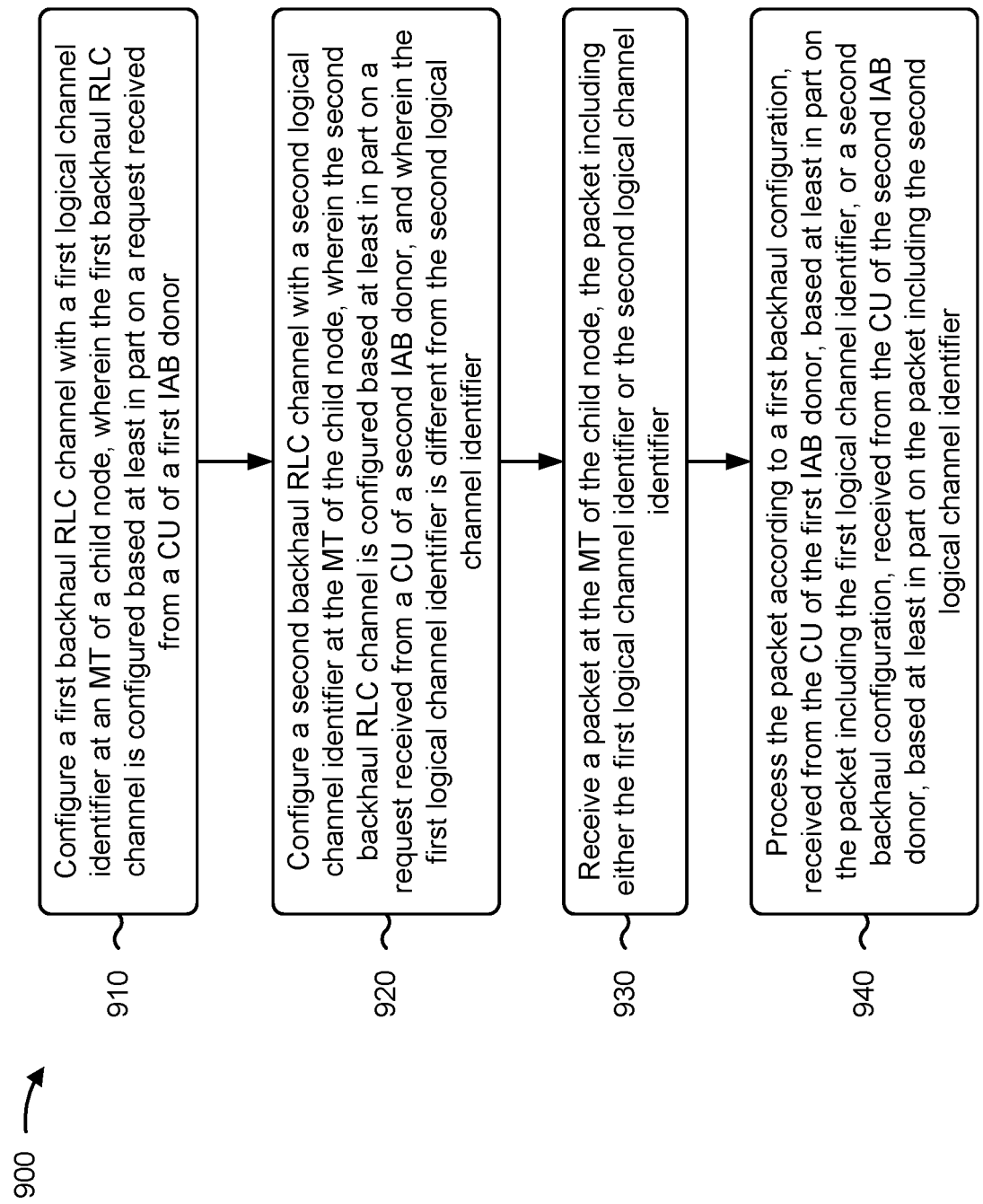

US 11,528,654 B2

TRANSPORT LAYER SEPARATION IN AN INTEGRATED ACCESS AND BACKHAUL NETWORK

CROSS-REFERENCE TO RELATED APPLICATION

This Patent Application claims priority to Provisional Patent Application No. 63/037,853, filed on Jun. 11, 2020, entitled "TRANSPORT LAYER SEPARATION IN AN INTEGRATED ACCESS AND BACKHAUL NETWORK," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for transport layer separation in an integrated access and backhaul (IAB) network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a parent node includes configuring a first backhaul radio link control (RLC) channel at a distributed unit (DU) of the parent node based at least in part on a request received from a central unit (CU) of a first integrated access and backhaul (IAB) donor; configuring a second backhaul RLC channel at the DU of the parent node based at least in part on a request received from a CU of a second IAB donor; selecting a first logical channel identifier for the first backhaul RLC channel based at least in part on the configuring of the first backhaul RLC channel; selecting a second logical channel identifier for the second backhaul RLC channel based at least in part on the configuring of the second backhaul RLC channel, wherein the second logical channel identifier is different from the first logical channel identifier; providing the first logical channel identifier to the CU of the first IAB donor; providing the second logical channel identifier to the CU of the second IAB donor; receiving a packet at the DU of the parent node, the packet including either the first logical channel identifier or the second logical channel identifier; and processing the packet according to: a first backhaul configuration, received from the CU of the first IAB donor, based at least in part on the packet including the first logical channel identifier, or a second backhaul configuration, received from the CU of the second IAB donor, based at least in part on the packet including the second logical channel identifier.

In some aspects, a method of wireless communication performed by a child node includes configuring a first backhaul RLC channel with a first logical channel identifier at a mobile termination function (MT) of the child node, wherein the first backhaul RLC channel is configured based at least in part on a request received from a CU of a first IAB donor; configuring a second backhaul RLC channel with a second logical channel identifier at the MT of the child node, wherein the second backhaul RLC channel is configured based at least in part on a request received from a CU of a second IAB donor, and wherein the first logical channel identifier is different from the second logical channel identifier; receiving a packet at the MT of the child node, the packet including either the first logical channel identifier or the second logical channel identifier; and processing the packet according to: a first backhaul configuration, received from the CU of the first IAB donor, based at least in part on the packet including the first logical channel identifier, or a second backhaul configuration, received from the CU of the second IAB donor, based at least in part on the packet including the second logical channel identifier.

In some aspects, a parent node for wireless communication includes a memory and one or more processors coupled to the memory, the memory and the one or more processors configured to: configure a first backhaul RLC channel at a DU of the parent node based at least in part on a request received from a CU of a first IAB donor; configure a second backhaul RLC channel at the DU of the parent node based at least in part on a request received from a CU of a second IAB donor; select a first logical channel identifier for the first backhaul RLC channel based at least in part on the configuring of the first backhaul RLC channel; select a second logical channel identifier for the second backhaul RLC channel based at least in part on the configuring of the second backhaul RLC channel, wherein the second logical channel identifier is different from the first logical channel identifier; provide the first logical channel identifier to the CU of the first IAB donor; provide the second logical channel identifier to the CU of the second IAB donor; receive a packet at the DU of the parent node, the packet including either the first logical channel identifier or the second logical channel identifier; and process the packet according to: a first backhaul configuration, received from the CU of the first IAB donor, based at least in part on the packet including the first logical channel identifier, or a second backhaul configuration, received from the CU of the second IAB donor, based at least in part on the packet including the second logical channel identifier.

In some aspects, a child node for wireless communication includes a memory and one or more processors coupled to the memory, the memory and the one or more processors configured to: configure a first backhaul RLC channel with a first logical channel identifier at an MT of the child node, wherein the first backhaul RLC channel is configured based at least in part on a request received from a CU of a first IAB donor; configure a second backhaul RLC channel with a second logical channel identifier at the MT of the child node, wherein the second backhaul RLC channel is configured based at least in part on a request received from a CU of a second IAB donor, and wherein the first logical channel identifier is different from the second logical channel identifier; receive a packet at the MT of the child node, the packet including either the first logical channel identifier or the second logical channel identifier; and process the packet according to: a first backhaul configuration, received from the CU of the first IAB donor, based at least in part on the packet including the first logical channel identifier, or a second backhaul configuration, received from the CU of the second IAB donor, based at least in part on the packet including the second logical channel identifier.

In some aspects, a non-transitory computer-readable medium storing one or more instructions for wireless communication includes one or more instructions that, when executed by one or more processors of a parent node, cause the one or more processors to: configure a first backhaul RLC channel at a DU of the parent node based at least in part on a request received from a CU of a first IAB donor; configure a second backhaul RLC channel at the DU of the parent node based at least in part on a request received from a CU of a second IAB donor; select a first logical channel identifier for the first backhaul RLC channel based at least in part on the configuring of the first backhaul RLC channel; select a second logical channel identifier for the second backhaul RLC channel based at least in part on the configuring of the second backhaul RLC channel, wherein the second logical channel identifier is different from the first logical channel identifier; provide the first logical channel identifier to the CU of the first IAB donor; provide the second logical channel identifier to the CU of the second IAB donor; receive a packet at the DU of the parent node, the packet including either the first logical channel identifier or the second logical channel identifier; and process the packet according to: a first backhaul configuration, received from the CU of the first IAB donor, based at least in part on the packet including the first logical channel identifier, or a second backhaul configuration, received from the CU of the second IAB donor, based at least in part on the packet including the second logical channel identifier.

In some aspects, a non-transitory computer-readable medium storing one or more instructions for wireless communication includes one or more instructions that, when executed by one or more processors of a child node, cause the one or more processors to: configure a first backhaul RLC channel with a first logical channel identifier at an MT of the child node, wherein the first backhaul RLC channel is configured based at least in part on a request received from a CU of a first IAB donor; configure a second backhaul RLC channel with a second logical channel identifier at the MT of the child node, wherein the second backhaul RLC channel is configured based at least in part on a request received from a CU of a second IAB donor, and wherein the first logical channel identifier is different from the second logical channel identifier; receive a packet at the MT of the child node, the packet including either the first logical channel identifier or the second logical channel identifier; and process the packet according to: a first backhaul configuration, received from the CU of the first IAB donor, based at least in part on the packet including the first logical channel identifier, or a second backhaul configuration, received from the CU of the second IAB donor, based at least in part on the packet including the second logical channel identifier.

In some aspects, an apparatus for wireless communication includes means for configuring a first backhaul RLC channel at a DU of the apparatus based at least in part on a request received from a CU of a first IAB donor; means for configuring a second backhaul RLC channel at the DU of the apparatus based at least in part on a request received from a CU of a second IAB donor; means for selecting a first logical channel identifier for the first backhaul RLC channel based at least in part on the configuring of the first backhaul RLC channel; means for selecting a second logical channel identifier for the second backhaul RLC channel based at least in part on the configuring of the second backhaul RLC channel, wherein the second logical channel identifier is different from the first logical channel identifier; means for providing the first logical channel identifier to the CU of the first IAB donor; means for providing the second logical channel identifier to the CU of the second IAB donor; means for receiving a packet at the DU of the apparatus, the packet including either the first logical channel identifier or the second logical channel identifier; and means for processing the packet according to: a first backhaul configuration, received from the CU of the first IAB donor, based at least in part on the packet including the first logical channel identifier, or a second backhaul configuration, received from the CU of the second IAB donor, based at least in part on the packet including the second logical channel identifier.

In some aspects, an apparatus for wireless communication includes means for configuring a first backhaul RLC channel with a first logical channel identifier at an MT of the apparatus, wherein the first backhaul RLC channel is configured based at least in part on a request received from a CU of a first IAB donor; means for configuring a second backhaul RLC channel with a second logical channel identifier at the MT of the apparatus, wherein the second backhaul RLC channel is configured based at least in part on a request received from a CU of a second IAB donor, and wherein the first logical channel identifier is different from the second logical channel identifier; means for receiving a packet at the MT of the apparatus, the packet including either the first logical channel identifier or the second logical channel identifier; and means for processing the packet according to: a first backhaul configuration, received from the CU of the first IAB donor, based at least in part on the packet including the first logical channel identifier, or a second backhaul configuration, received from the CU of the second IAB donor, based at least in part on the packet including the second logical channel identifier.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 8 and 9 are diagrams illustrating example processes associated with transport layer separation in an IAB network, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
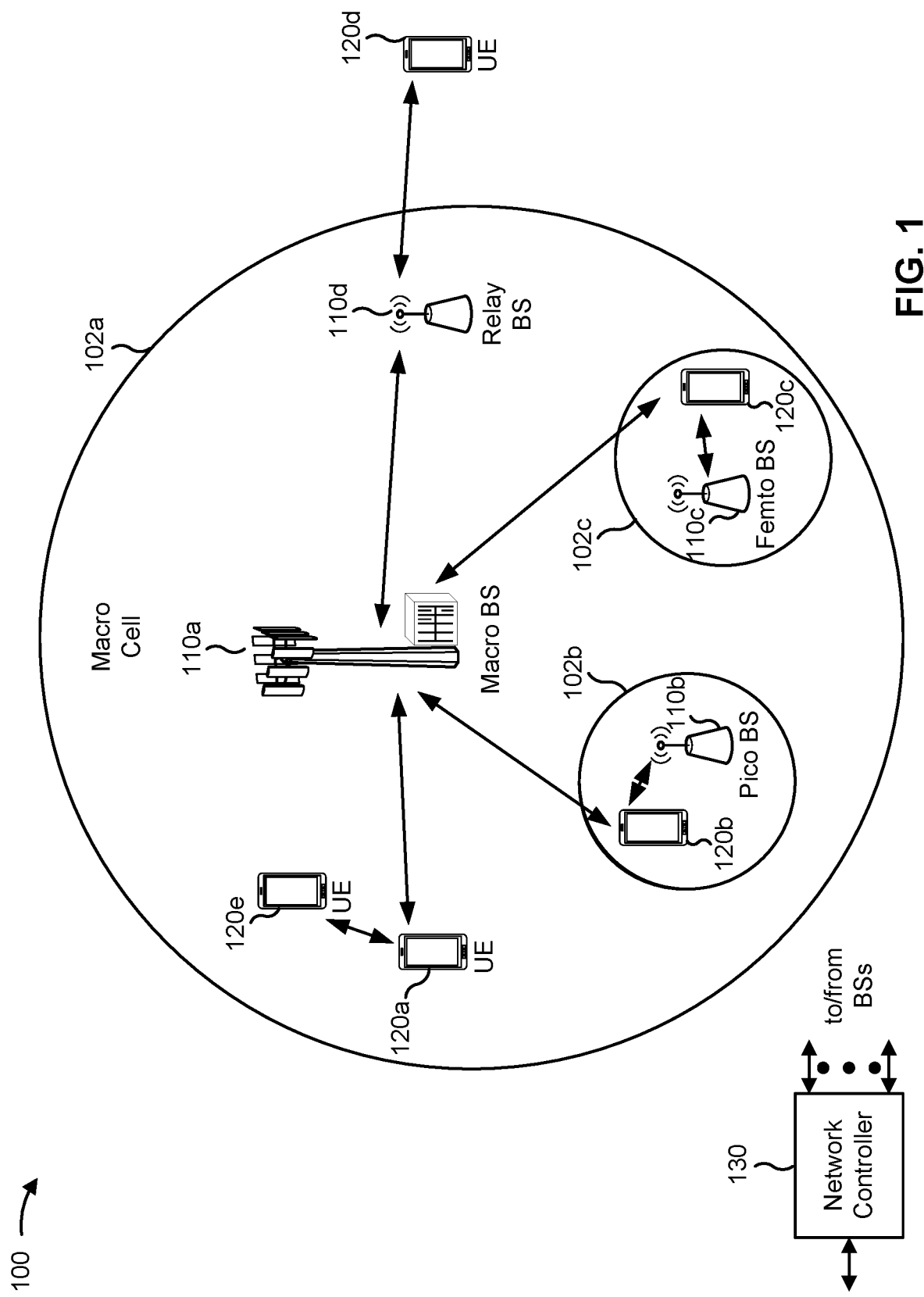
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
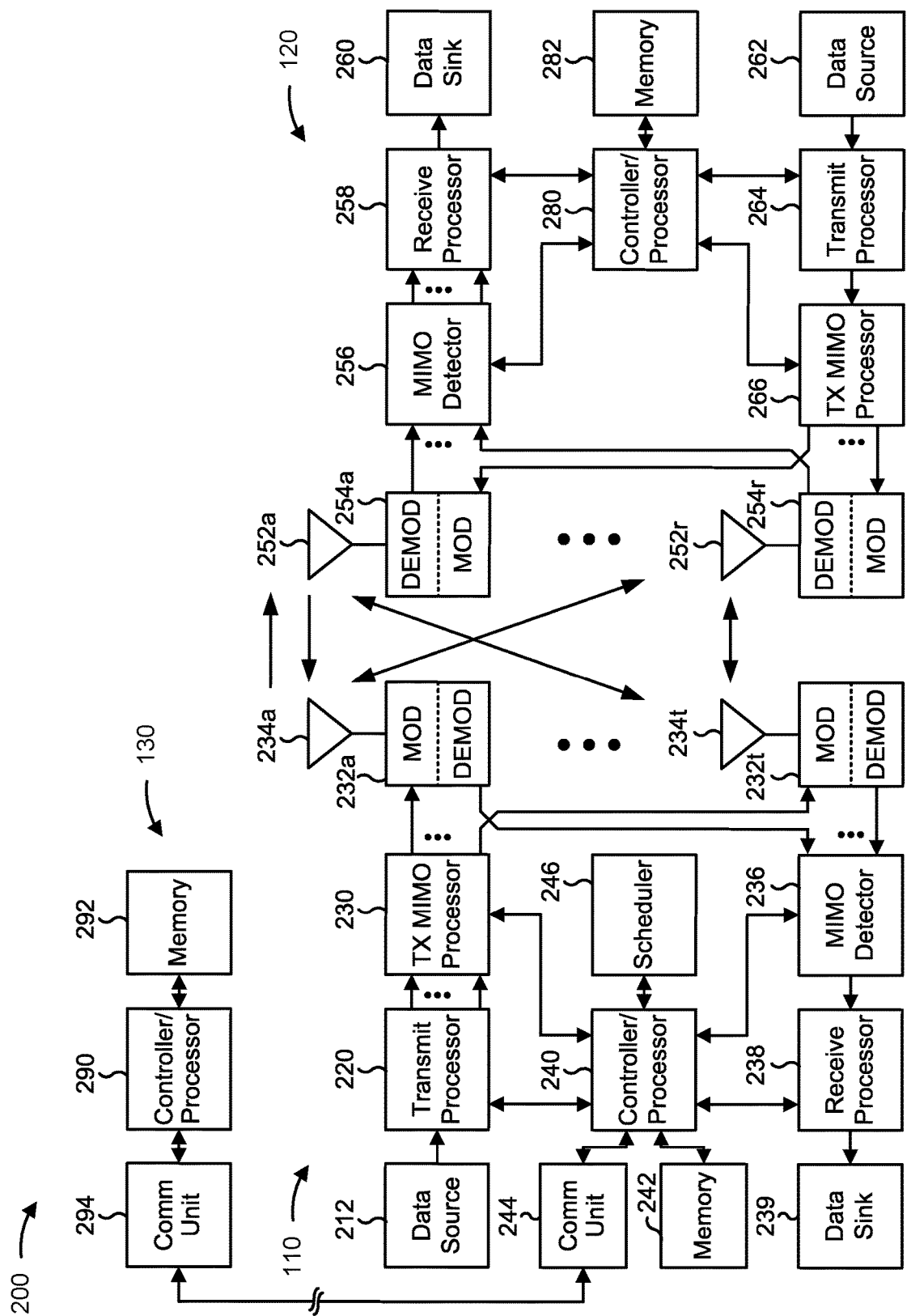
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5A, 5B, 6A, 6B, 7, and 8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5A, 5B, 6A, 6B, 7, and 8).

Controller/processor 240 of base station 110, controller/processor 280 of UE 120, and/or any other component(s) of FIG. 2 may perform one or more techniques associated with transport layer separation in an IAB network, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, an IAB node (e.g., a UE 120, a base station 110) may include means for configuring a first backhaul RLC channel at a DU of the parent node based at least in part on a request received from a CU of a first IAB donor; means for configuring a second backhaul RLC channel at the DU of the parent node based at least in part on a request received from a CU of a second IAB donor; means for selecting a first logical channel identifier for the first backhaul RLC channel based at least in part on the configuring of the first backhaul RLC channel; means for selecting a second logical channel identifier for the second backhaul RLC channel based at least in part on the configuring of the second backhaul RLC channel, wherein the second logical channel identifier is different from the first logical channel identifier; means for providing the first logical channel identifier to the CU of the first IAB donor; means for providing the second logical channel identifier to the CU of the second IAB donor; means for receiving a packet at the DU of the parent node, the packet including either the first logical channel identifier or the second logical channel identifier; and/or means for processing the packet according to a first backhaul configuration, received from the CU of the first IAB donor, based at least in part on the packet including the first logical channel identifier, or a second backhaul configuration, received from the CU of the second IAB donor, based at least in part on the packet including the second logical channel identifier. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, and/or antenna 234.

In some aspects, an IAB node (e.g., a UE 120, a base station 110) may include means for configuring a first backhaul RLC channel with a first logical channel identifier at a mobile termination function (MT) of the child node, wherein the first backhaul RLC channel is configured based at least in part on a request received from a CU of a first IAB donor; means for configuring a second backhaul RLC channel with a second logical channel identifier at the MT of the child node, wherein the second backhaul RLC channel is configured based at least in part on a request received from a CU of a second IAB donor, and wherein the first logical channel identifier is different from the second logical channel identifier; means for receiving a packet at the MT of the child node, the packet including either the first logical channel identifier or the second logical channel identifier; and/or means for processing the packet according to a first backhaul configuration, received from the CU of the first IAB donor, based at least in part on the packet including the first logical channel identifier, or a second backhaul configuration, received from the CU of the second IAB donor, based at least in part on the packet including the second logical channel identifier. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, and/or antenna 234.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
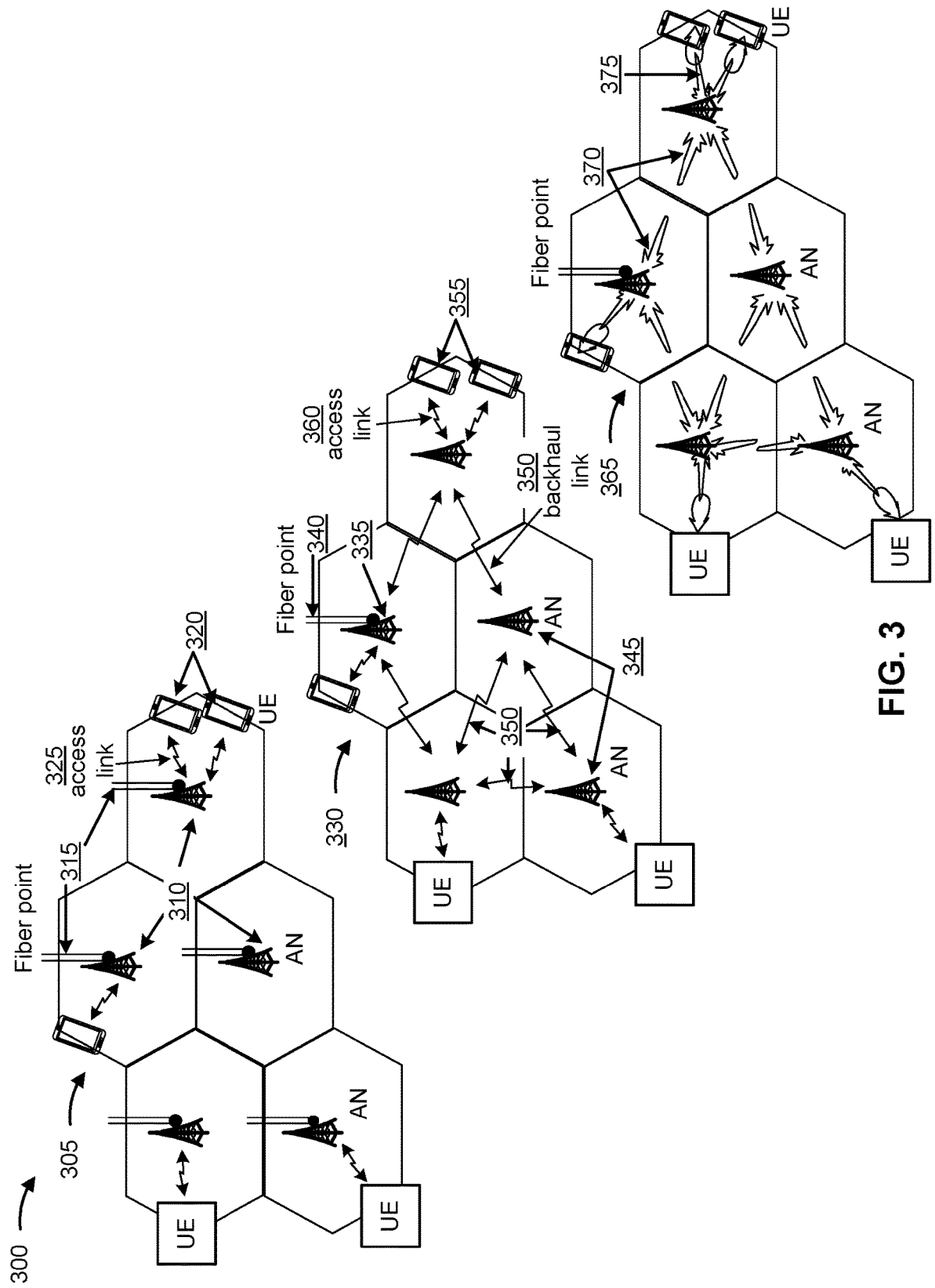
FIG. 3 is a diagram illustrating examples of radio access networks, in accordance with the present disclosure.

FIG. 3 is a diagram illustrating examples 300 of radio access networks, in accordance with the present disclosure.

As shown by reference number 305, a traditional (e.g., 3G, 4G, and/or LTE) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an IAB network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming) for communications between base stations and/or UEs (e.g., between two base stations, between two UEs, and/or between a base station and a UE). For example, wireless backhaul links 370 between base stations (e.g., base stations 110) may use millimeter wave signals to carry information and/or may be directed toward a target base station (e.g., a base station 110) using beamforming. Similarly, the wireless access links 375 between a UE (e.g., a UE 120) and a base station (e.g., a base station 110) may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network, and/or a device-to-device network). In this case, a UE that is directly in communication with a base station (e.g., an anchor base station or a non-anchor base station) may be referred to as an anchor node.

As indicated above, FIG. 3 is provided as an example. Other examples may differ from what is described with regard to FIG. 3.

Figure 4:
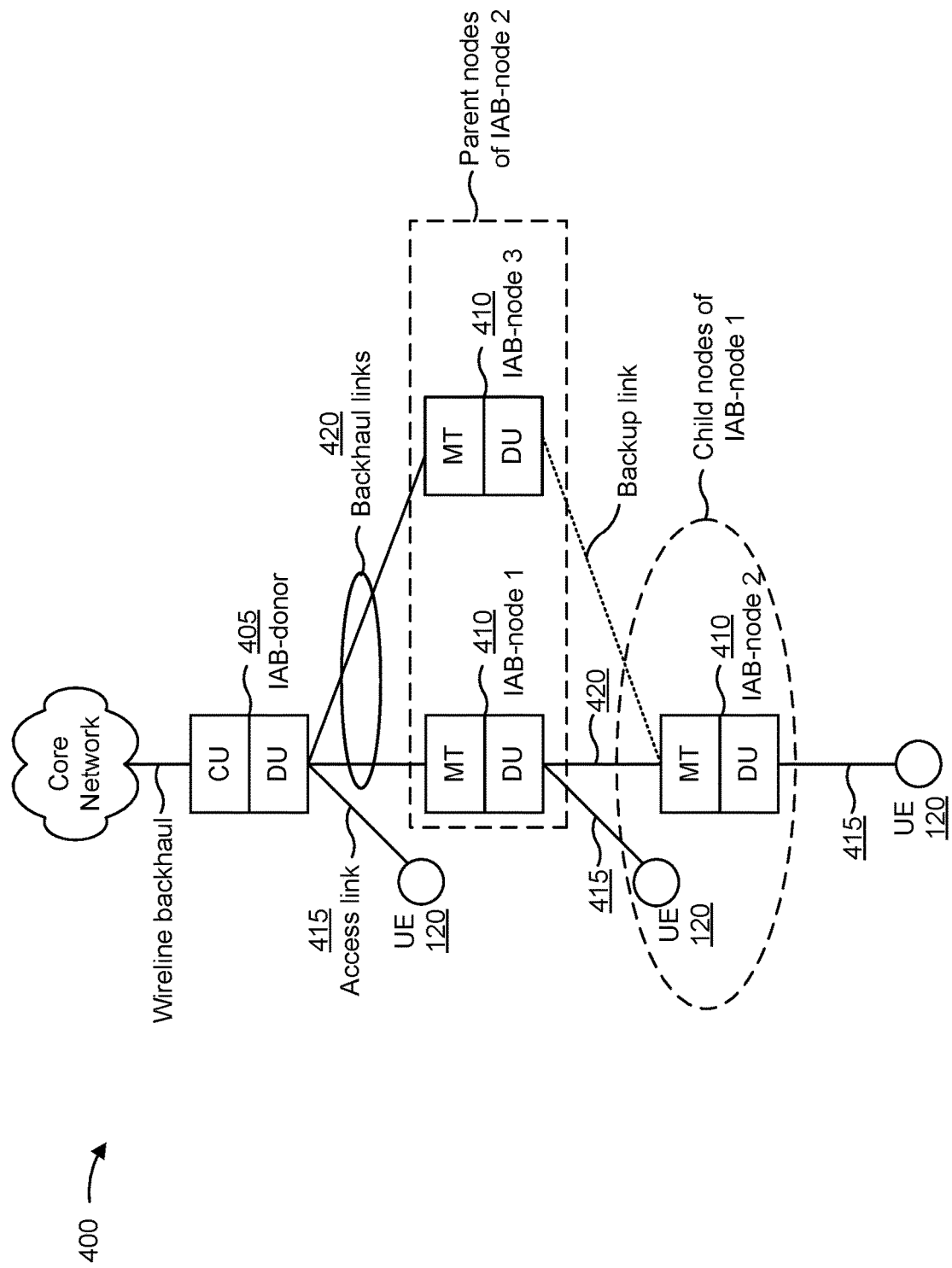
FIG. 4 is a diagram illustrating an example of an IAB network architecture, in accordance with the present disclosure.

FIG. 4 is a diagram illustrating an example 400 of an IAB network architecture, in accordance with the present disclosure.

As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (AMF). In some aspects, an IAB donor 405 may include a base station 110, such as an anchor base station, as described above in connection with 3. As shown, an IAB donor 405 may include a central unit (CU), which may perform access node controller (ANC) functions, and/or AMF functions. The CU may configure one or more distributed units (DUs) of the IAB donor 405 and/or may configure one or more IAB nodes 410 (e.g., an MT and/or one or more DUs of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message, and/or an F1 application protocol (F1AP) message).

As further shown in FIG. 4, the IAB network may include IAB nodes 410 (shown as IAB-node 1, IAB-node 2, and IAB-node 3) that connect to the core network via the IAB donor 405. As shown, an IAB node 410 may include mobile termination (MT) functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, and/or spatial resources) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, and/or becomes overloaded. For example, a backup link 425 between IAB-node 2 and IAB-node 3 may be used for backhaul communications if a primary backhaul link between IAB-node 2 and IAB-node 1 fails. As used herein, "node" or "wireless node" may refer to an IAB donor 405 or an IAB node 410.

As indicated above, FIG. 4 is provided as an example. Other examples may differ from what is described with regard to FIG. 4.

An IAB node may be configured with one or more ingress backhaul links and one or more egress backhaul links. Each ingress backhaul link is a link between the IAB node and a prior hop in the IAB network (i.e., an IAB node or an IAB donor from which the IAB node may receive packets), while each egress backhaul link is a link between the IAB node and a next hop in the IAB network (i.e., an IAB node or an IAB donor to which the IAB node may transmit packets). A set of backhaul RLC channels may be configured within each backhaul link. As an example, an IAB node may be configured with an ingress backhaul link comprising a set of ingress backhaul RLC channels, may be configured with a first egress backhaul link comprising a set of egress backhaul RLC channels, and may be configured with a second egress backhaul link comprising another set of egress backhaul RLC channels. In one example, the ingress backhaul link may be with a parent of the IAB node, the first egress backhaul link may be with a first child of the IAB node, and the second egress backhaul link may be with a second child of the IAB node. As an alternative example, the ingress backhaul link may be with a child of the IAB node, the first egress backhaul link may be with a first parent of the IAB node, and the second egress backhaul link may be with a second parent of the IAB node.

Routing of a packet in an IAB network may be performed using the backhaul adaptation protocol (BAP). According to the BAP, a packet is routed based on a BAP routing identifier, which comprises two parts—a BAP address (e.g., a 10 bit address) and a BAP path identifier. The BAP address designates a destination node of the packet (i.e., an address of a destination to which the packet is ultimately to be provided). The BAP path identifier identifies a path to be used for routing the packet through the IAB network. Notably, the use of BAP path identifiers allows differentiation of multiple routes to the same destination node. In operation, when a source in an IAB network transmits a packet (destined for a destination) in the IAB network, the source adds a BAP header, including the BAP routing identifier, to the packet (e.g., when the packet enters a BAP layer from a higher layer in a protocol stack). As the packet is routed through the IAB network, each intermediate hop (i.e., each IAB node between the source and the destination) routes the packet to a next hop based on the BAP routing identifier and a routing configuration configured on the intermediate hop. In some cases, in association with routing the packet, an intermediate hop may map the packet to a particular egress backhaul RLC channel (e.g., to provide a particular quality of service (QoS)). Examples of routing using the BAP protocol in the uplink and downlink directions are provided below.

In an example operation in an uplink direction, a BAP layer of a source, such as an IAB node, receives a packet (e.g., a packet including user plane data, a packet including control plane data, a packet including another type of data) from a higher layer. The IAB node determines a BAP routing identifier (including a destination BAP address and BAP path identifier). The IAB node may determine the BAP routing identifier based at least in part on, for example, information that identifies a destination for the packet, a QoS level associated with the packet, and/or a routing configuration. The IAB node then adds a BAP header, including the BAP routing identifier, to the packet and determines (e.g., based at least in part on the BAP path identifier, the QoS level associated with the packet, and/or the routing configuration) a BAP address of a next hop (which in this example is an intermediate IAB node), an egress backhaul link over which the packet is to be transmitted to the intermediate hop, and a particular egress backhaul RLC channel of the egress backhaul link to be used for transmitting the packet. The IAB node then transmits the packet to the intermediate IAB node on the particular egress backhaul RLC channel of the egress backhaul link. The intermediate IAB node receives the packet on an ingress backhaul RLC channel of an ingress backhaul link. The intermediate IAB node determines (e.g., based at least in part on the destination BAP address, the BAP path identifier, and/or a routing configuration) a BAP address of a next hop (which in this example is a DU of an IAB donor, referred to herein as an IAB donor DU), an egress backhaul link over which the packet is to be transmitted to the IAB donor, and a particular egress backhaul RLC channel of the egress backhaul link to be used for transmitting the packet. The intermediate IAB node then transmits the packet to the IAB donor DU on the particular egress backhaul RLC channel of the egress backhaul link. The IAB donor DU receives the packet on an ingress backhaul RLC channel of an ingress backhaul link. The IAB donor DU verifies whether the BAP address in the BAP header matches a BAP address of the IAB donor DU and, if so, strips the BAP header and provides the packet to a higher layer (e.g., for further processing).

In an example operation in a downlink direction, a BAP layer of a source, such as an IAB donor DU, receives a packet (e.g., a packet including user plane data, a packet including control plane data, a packet including another type of data) from a higher layer. The IAB donor DU determines a BAP routing identifier (including a destination BAP address and BAP path identifier). The IAB donor DU may determine the BAP routing identifier based at least in part on, for example, information that identifies a destination for the packet, a QoS level associated with the packet, and/or a routing configuration. The IAB donor DU then adds a BAP header, including the BAP routing identifier, to the packet. The IAB donor DU determines (e.g., based at least in part on the destination BAP address, the BAP path identifier, and/or a routing configuration) a BAP address of a next hop (which in this example is an intermediate IAB node), an egress backhaul link over which the packet is to be transmitted to the intermediate IAB node, and a particular egress backhaul RLC channel of the egress backhaul link to be used for transmitting the packet. The IAB node then transmits the packet to the intermediate IAB node on the particular egress backhaul RLC channel of the egress backhaul link. The intermediate IAB node receives the packet on an ingress backhaul RLC channel of an ingress backhaul link, and determines whether the BAP address in the BAP header matches a BAP address of the intermediate IAB node. In this example, the intermediate IAB node determines that the BAP address in the BAP header does not match the BAP address of the intermediate IAB node. The intermediate IAB node then determines (e.g., based at least in part on the destination BAP address, the BAP path identifier, and/or a routing configuration) a BAP address of a next hop (which in this example is the destination IAB node), an egress backhaul link over which the packet is to be transmitted to the destination IAB node, and a particular egress backhaul RLC channel of the egress backhaul link to be used for transmitting the packet. The intermediate IAB node then transmits the packet to the destination IAB node on the particular egress backhaul RLC channel of the egress backhaul link. The destination IAB node receives the packet on an ingress backhaul RLC channel of an ingress backhaul link, and determines whether the BAP address in the BAP header matches a BAP address of the destination IAB node. Here, the destination IAB node determines that the BAP address in the BAP header matches the BAP address of the destination IAB node, strips the BAP header, and provides the packet to higher layers (e.g., for further processing).

As noted above, a backhaul RLC channel may be configured on a backhaul link between devices in an IAB network. Such a backhaul RLC channel can be configured by a CU of an IAB donor (referred to herein as an IAB donor CU). For example, an IAB donor CU may determine that a backhaul RLC channel is to be configured on a backhaul link between an IAB DU (e.g., a DU of the IAB donor or a DU of a first IAB node) and an IAB MT (e.g., an MT of the first IAB node or an MT of a second IAB node). In this example, the IAB donor CU first selects a backhaul RLC channel identifier for the backhaul RLC channel. The IAB donor CU then provides, to the IAB DU, a request (e.g., an F1AP UE context setup/modification request) to configure the backhaul RLC channel, where the request includes the selected backhaul RLC channel identifier. The IAB DU receives the request and configures the backhaul RLC channel. The IAB DU also selects a logical channel identifier for the backhaul RLC channel, and provides, to the IAB donor CU, a response (e.g., an F1AP UE context setup/modification response) that includes a cell group configuration. Here, the cell group configuration includes the backhaul RLC channel identifier and the selected logical channel identifier. The IAB donor CU receives the response, and provides, to the IAB MT, a request (e.g., an RRC reconfiguration request) including the cell group configuration that includes the backhaul RLC channel identifier and the logical channel identifier. The IAB MT receives the request, configures the backhaul RLC channel, and provides a response (e.g., an RRC reconfiguration complete message) to the IAB donor CU. Notably, after configuration of the backhaul RLC channel, each of the IAB donor CU, the IAB DU, and the IAB MT have information that associates the configured backhaul RLC channel with the backhaul RLC channel identifier and the logical channel identifier.

Figure 5C:
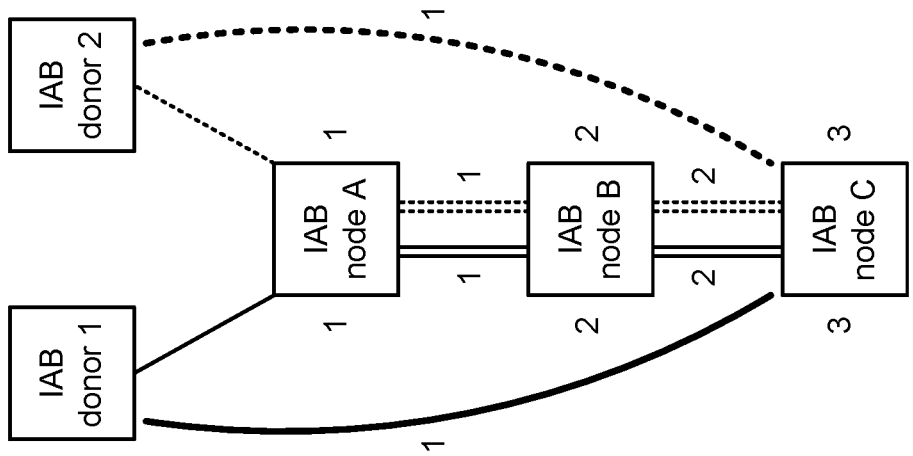
FIGS. 5A-5C are diagrams illustrating an example of ambiguities that can arise in association with routing in an IAB network when an IAB node is included in multiple branches of the IAB network, in accordance with the present disclosure.
Figure 5B:
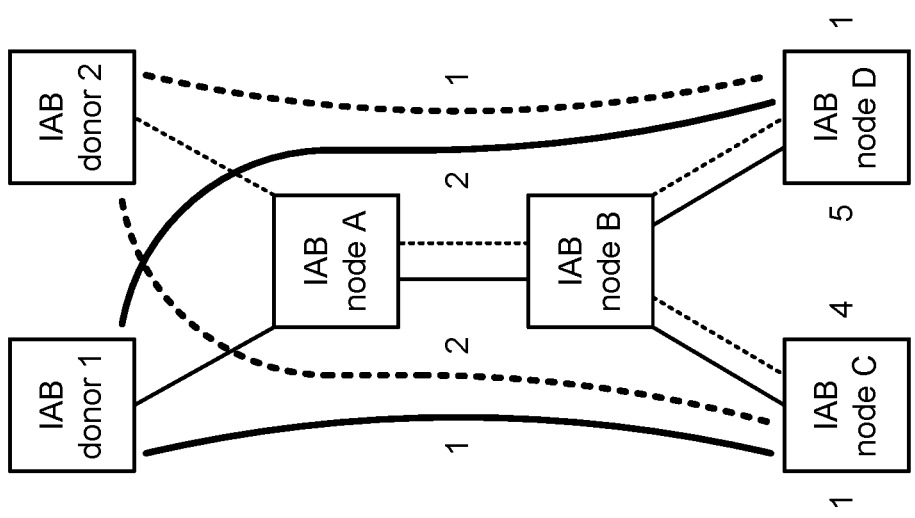
Figure 5A:
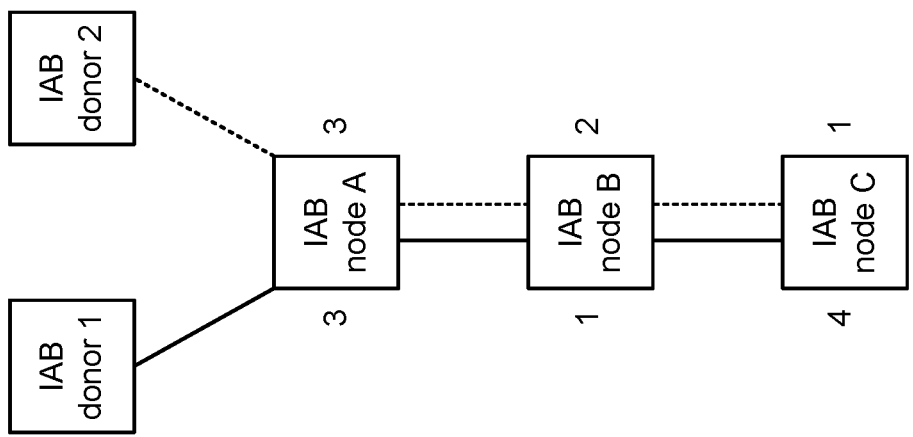

In some IAB network deployments, an IAB node may be configured to communicate with multiple IAB donors. That is, in some IAB deployments, branches of an IAB network may overlap such that an IAB node is included in two or more branches, where each branch is associated with a different IAB donor. In such cases, ambiguity can arise when routing according to the BAP protocol. FIGS. 5A-5C are diagrams illustrating examples of ambiguities that can arise in association with routing in an IAB network when an IAB node is included in multiple branches of the IAB network. Notably, while FIGS. 5A-5C illustrate examples of a packet being routed in the downlink direction, the ambiguities described below can also arise in the context of a packet being routed in the uplink direction.

In the example shown in FIG. 5A, IAB nodes A, B, and C (e.g., each of which may be an IAB node 410) are included a first branch of an IAB network that is associated with IAB donor 1 (e.g., a first IAB donor 405) and a second branch of the IAB network that is associated with IAB donor 2 (e.g., a second IAB donor 405). Backhaul links associated with IAB donor 1 are shown in solid lines, while backhaul links associated with IAB donor 2 are shown in dotted lines. BAP addresses of each IAB node are indicated in FIG. 5A. As shown, IAB node A has a BAP address of value 3 in the first branch of the IAB network (e.g., according to a configuration by the IAB donor 1 CU) and has a BAP address of value 3 in the second branch of the IAB network (e.g., according to a configuration by the IAB donor 2 CU). As further shown, IAB node B has a BAP address of value 1 in the first branch and has a BAP address of value 2 in the second branch. As further shown, IAB node C has a BAP address of value 4 in the first branch and has a BAP address of value 1 in the second branch.

In the example shown in FIG. 5A, assume that IAB node B receives, from IAB node A, a packet including a BAP header with a BAP address value of 1. Here, the BAP address value in the packet matches the BAP address value of IAB node B in the first branch, but does not match the BAP address value of IAB node B in the second branch. Rather, the BAP address value in the packet matches the BAP address value of IAB node C in the second branch. Thus, when routing the packet based on the BAP protocol, IAB node B is unable to determine whether the packet is to be provided to higher layers at IAB node B or is to be forwarded to IAB node C.

In the example shown in FIG. 5B, IAB nodes A, B, C, and D (e.g., each of which may be an IAB node 410) are included in a first branch of an IAB network that is associated with IAB donor 1 (e.g., a first IAB donor 405) and a second branch of the IAB network that is associated with IAB donor 2 (e.g., a second IAB donor 405). Backhaul links associated with IAB donor 1 are shown in thin solid lines, while backhaul links associated with IAB donor 2 are shown in thin dotted lines. BAP addresses of IAB node C and IAB node D are indicated in FIG. 5B. As shown, IAB node C has a BAP address of value 1 in the first branch of the IAB network (e.g., according to a configuration by the IAB donor 1 CU) and has a BAP address of value 4 in the second branch of the IAB network (e.g., according to a configuration by the IAB donor 2 CU). As further shown, IAB node D has a BAP address of value 5 in the first branch and has a BAP address of value 1 in the second branch. BAP paths associated with IAB donor 1 are shown in thick solid lines, while BAP paths associated with IAB donor 2 are shown in thick dotted lines. As shown, a BAP path from IAB donor 1 to IAB node C has a BAP path identifier of value 1 (e.g., according to a configuration by the IAB donor 1 CU) and a BAP path from IAB donor 1 to IAB node D has a BAP path identifier of value 2 (e.g., according to a configuration by the IAB donor 2 CU). As further shown, a BAP path from IAB donor 2 to IAB node C has a BAP path identifier of value 2 and a BAP path from IAB donor 2 to IAB node D has a BAP path identifier of value 1.

In the example shown in FIG. 5B, assume that IAB node B receives, from IAB node A, a packet including a BAP header with a BAP address value of 1 and a BAP path identifier of value 1. Here, the BAP address value in the packet matches the BAP address value of IAB node C in the first branch and the BAP path identifier in the packet matches the BAP path identifier of the path between IAB donor 1 and IAB node C. However, the BAP address value in the packet also matches the BAP address value of IAB node D in the second branch and the BAP path identifier in the packet matches the BAP path identifier of the path between IAB donor 2 and IAB node D. Thus, when routing the packet based on the BAP protocol, IAB node B is unable to determine whether the packet is to be provided to IAB node C or IAB node D.

In the example shown in FIG. 5C, IAB nodes A, B, and C (e.g., each of which may be an IAB node 410) are included a first branch of an IAB network that is associated with IAB donor 1 (e.g., a first IAB donor 405) and a second branch of the IAB network that is associated with IAB donor 2 (e.g., a second IAB donor 405). Backhaul links associated with IAB donor 1 are shown in thin single solid lines, while backhaul links associated with IAB donor 2 are shown in thin single dotted lines. BAP addresses of IAB nodes A, B, and C are indicated in FIG. 5C. As shown, IAB node A has a BAP address of value 1 in the first branch of the IAB network (e.g., according to a configuration by the IAB donor 1 CU) and has a BAP address of value 1 in the second branch of the IAB network (e.g., according to a configuration by the IAB donor 2 CU). As further shown, IAB node B has a BAP address of value 2 in the first branch and has a BAP address of value 2 in the second branch. As further shown, IAB node C has a BAP address of value 3 in the first branch and has a BAP address of value 3 in the second branch. BAP paths associated with IAB donor 1 are shown in thick solid lines, while BAP paths associated with IAB donor 2 are shown in thick dotted lines. As shown, a BAP path from IAB donor 1 to IAB node C has a BAP path identifier of value 1. As further shown, a BAP path from IAB donor 2 to IAB node C has a BAP path identifier of value 1. Backhaul RLC channels between IAB nodes in the first branch are shown in double solid lines, while backhaul RLC channels between IAB nodes in the second branch are shown in double dotted lines. As shown, in the first branch, a backhaul RLC channel between IAB node A and IAB node B has a backhaul RLC channel identifier of value 1 and a backhaul RLC channel between IAB node B and IAB node C has a backhaul RLC channel identifier of value 2. Similarly, in the second branch, a backhaul RLC channel between IAB node A and IAB node B has a backhaul RLC channel identifier of value 1 and a backhaul RLC channel between IAB node B and IAB node C has a backhaul RLC channel identifier of value 2.

In the example shown in FIG. 5C, assume that IAB node B receives, from IAB node A, a packet including a BAP header with a BAP address value of 3 and a BAP path identifier of value 1 on ingress backhaul RLC channel with a backhaul RLC channel identifier of value 1. Here, the BAP address value in the packet matches the BAP address value of IAB node C in both the first and second branches, and the BAP path identifier in the packet matches the BAP path identifier of both the path between IAB donor 1 and IAB node C and the path between IAB donor 2 and IAB node C. In this example, when routing the packet based on the BAP protocol, IAB node B is unable to determine which logical channel identifier is to be used in communication with IAB node C and, therefore, is unable to determine which egress backhaul RLC channel is to be used for forwarding the packet to IAB node C. Notably, in this example, IAB node C would receive the packet no matter which backhaul RLC channel is used to forward the packet. However, the appropriate backhaul RLC channel should be used, for example, to ensure that a particular level of QoS is to be provided to the packet, and/or to enable the packet to be forwarded to another node appropriately (when there are additional network hops subsequent to IAB node C).

Some aspects described herein provide techniques and apparatuses for transport layer separation in an IAB network. The techniques and apparatuses described herein resolve the issues of ambiguity described above, thereby improving overall operation and performance of the IAB network. Additional details are provided below.

FIGS. 6A, 6B, 7A, and 7B are diagrams illustrating examples associated with transport layer separation in an IAB network, in accordance with the present disclosure. In FIGS. 6A, 6B, 7A, and 7B, a DU of a parent node has a signaling connection (e.g., a connection over an F1 interface, and/or an RRC connection) with a CU of IAB donor 1 (e.g., a first IAB donor 405) and has a signaling connection (e.g., a connection over an F1 interface, and/or an RRC connection) with a CU of IAB donor 2 (e.g., a second IAB donor 405). As noted, the parent node DU may be a DU of an IAB donor (e.g., IAB donor 1, IAB donor 2) or may be a DU of a first IAB node (e.g., a first IAB node 410). Further, an MT of a child node has a signaling connection (e.g., an RRC connection, and/or a connection over an F1 interface) with the CU of IAB donor 1, and has a signaling connection (e.g., an RRC connection, and/or a connection over an F1 interface) with the CU of IAB donor 2. The child node MT may be an MT of a the first IAB node (e.g., when the parent node DU is at an IAB donor) or may be a second IAB node (e.g., when the parent node DU is at a first IAB node, the child node MT may be at a second IAB node 410 that is a child of the first IAB node 410). In some aspects, the MT of the child node may include a first MT that is RRC connected to the IAB donor 1 CU and a second MT that is RRC connected to the IAB donor 2 CU. Alternatively, in some aspects, the MT of the child node is a single MT that is RRC connected to the IAB donor 1 CU and to the IAB donor 2 CU.

For the purposes of FIGS. 6A, 6B, 7A, and 7B, IAB donor 1 CU has determined that a backhaul RLC channel is to be configured on the backhaul link between the parent node and the child node for use on a first branch of an IAB network. Similarly, IAB donor 2 CU has determined that a backhaul RLC channel is to be configured on the backhaul link between the parent node and the child node for use on a second branch of an IAB network.

Figure 6A:
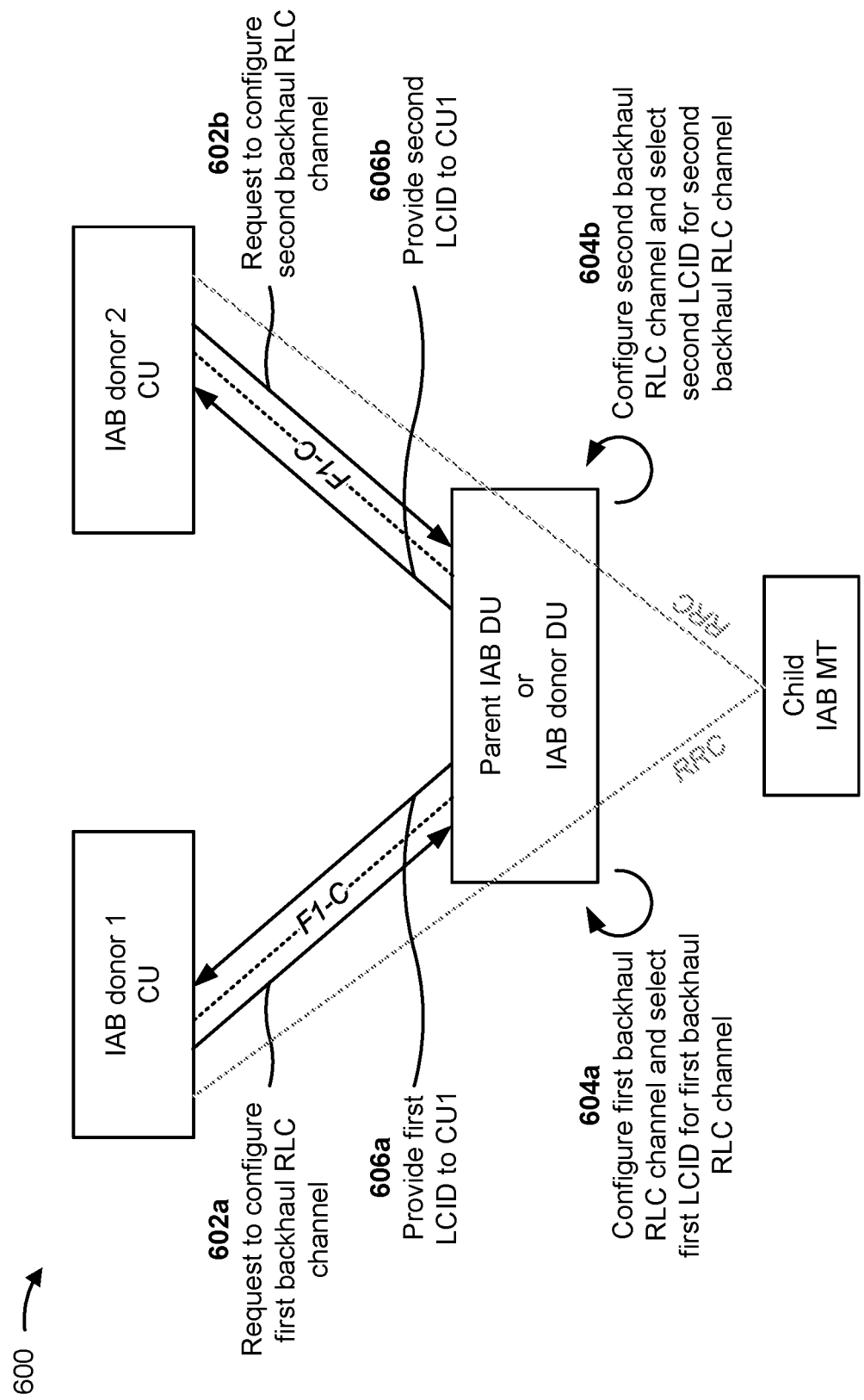
FIGS. 6A, 6B, 7A, and 7B are diagrams illustrating examples associated with transport layer separation in an IAB network, in accordance with the present disclosure.
Figure 6B:
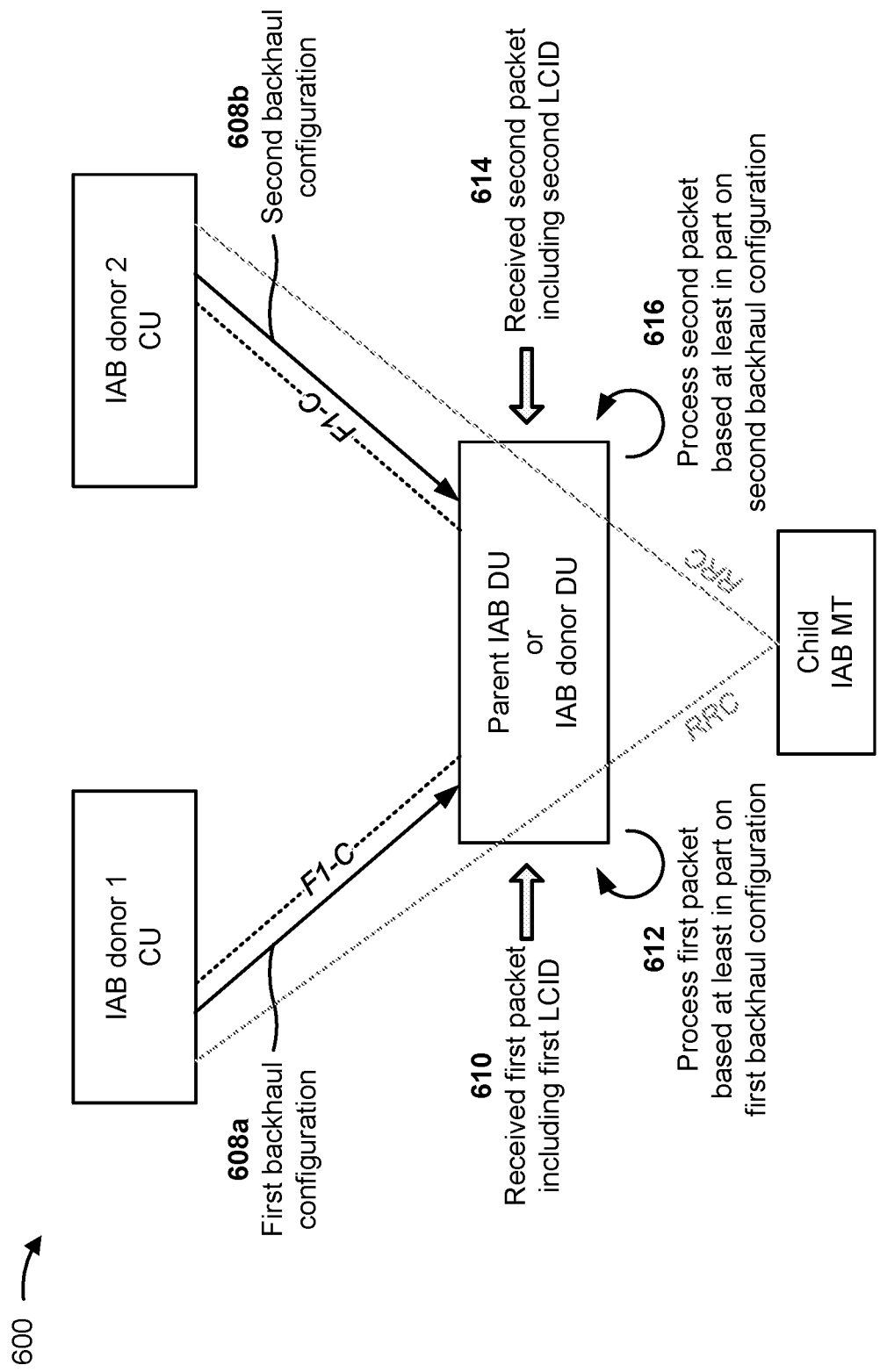

FIGS. 6A and 6B illustrate an example 600 illustrating operations performed by the parent node in association with configuration of the backhaul RLC channels and routing a packet.

As shown in FIG. 6A by reference 602a, the parent node may receive, from the IAB donor 1 CU (e.g., on the signaling connection between the parent node and the IAB donor 1 CU), a request (e.g., an F1AP UE context setup/modification request) to set up a first backhaul RLC channel (e.g., the backhaul RLC channel between the parent node and the child node on the first branch). In some aspects, the request includes a backhaul RLC channel identifier, selected by the IAB donor 1 CU, that is to be associated with the first backhaul RLC channel.

As shown by reference 604a, the parent node may configure the first backhaul RLC channel at the DU based at least in part on the request and may select a first logical channel identifier for the first backhaul RLC channel based at least in part on the configuring of the first backhaul RLC channel. In some aspects, the first logical channel identifier may be an extended logical channel identifier.

As shown by reference 606a, the parent node may provide (e.g., on the signaling connection between the parent node and the IAB donor 1 CU) the first logical channel identifier to the IAB donor 1 CU. For example, the parent node may provide, to the IAB donor 1 CU, a response (e.g., an F1AP UE context setup/modification response) that includes a cell group configuration including the backhaul RLC channel identifier associated with the first backhaul RLC channel (previously provided by the IAB donor 1 CU) and the first logical channel identifier selected by the parent node.

As shown in FIG. 6B by reference 608*a*, the parent node may receive, from the IAB donor 1 CU (e.g., on the signaling connection between the parent node and the IAB donor 1 CU), a first backhaul configuration. In this example, the first backhaul configuration is a backhaul configuration to be used by the parent node when routing packets on the first branch of the IAB network. The first backhaul configuration may include, for example, a BAP address assigned to the parent node on the first branch, a routing configuration associated with the first branch (e.g., information associated with mapping of an ingress link to an egress link), a mapping configuration associated with the first branch (e.g., uplink mapping information, downlink mapping information, and/or ingress-to-egress backhaul RLC channel mapping information), and/or another type of information.

Returning to FIG. 6A, with respect to the IAB donor 2 CU, as shown by reference 602*b*, the parent node may receive, from the IAB donor 2 CU (e.g., on the signaling connection between the parent node and the IAB donor 2 CU), a request (e.g., an F1AP UE context setup/modification request) to set up a second backhaul RLC channel. In some aspects, the request includes a backhaul RLC channel identifier, selected by the IAB donor 2 CU, that is to be associated with the second backhaul RLC channel.

As shown by reference 604*b*, the parent node may configure the second backhaul RLC channel at the DU based at least in part on the request and may select a second logical channel identifier for the second backhaul RLC channel based at least in part on the configuring of the second backhaul RLC channel. In some aspects, the second logical channel identifier may be an extended logical channel identifier. Here, the second logical channel identifier should be different from the first logical channel identifier. That is, the parent node may ensure that the second logical channel identifier, associated with the second backhaul RLC channel configured based on the request received from the IAB donor 2 CU, is different from the first logical channel identifier associated with the first backhaul RLC channel configured based on the request received from the IAB donor 1 CU.

As shown by reference 606*b*, the parent node may provide (e.g., on the signaling connection between the parent node and the IAB donor 2 CU) the second logical channel identifier to the IAB donor 2 CU. For example, the parent node may provide, to the IAB donor 2 CU, a response (e.g., an F1AP UE context setup/modification response) that includes a cell group configuration including the backhaul RLC channel identifier associated with the second backhaul RLC channel (previously provided by the IAB donor 2 CU) and the second logical channel identifier selected by the IAB DU.

As shown in FIG. 6B by reference 608*b*, the parent node may receive, from the IAB donor 2 CU (e.g., on the signaling connection between the parent node and the IAB donor 2 CU), a second backhaul configuration. In this example, the second backhaul configuration is a backhaul configuration to be used by the parent node when routing packets on the second branch of the IAB network. The second backhaul configuration may include, for example, a BAP address assigned to the parent node on the second branch, a routing configuration associated with the second branch (e.g., information associated with mapping of an ingress link to an egress link), a mapping configuration associated with the second branch (e.g., uplink mapping information, downlink mapping information, and/or ingress-to-egress backhaul RLC channel mapping information), and/or another type of information.

In some aspects, after configuration of the first and second backhaul RLC channels, the parent node may receive a packet at the DU of the parent node. In some aspects, one logical DU may be present per F1 connection. In some aspects, the packet may include a logical channel identifier associated with a backhaul RLC channel configured on the parent node. In the context of example 600, the packet may include the first logical channel identifier or may include the second logical channel identifier. Thus, upon receiving a packet, the parent node may determine whether the packet includes the first logical channel identifier (i.e., the logical channel identifier that corresponds to the first backhaul RLC channel associated with the first branch) or includes the second logical channel identifier (i.e., the logical channel identifier that corresponds to the second backhaul RLC channel associated with the second branch).

As shown by reference 610, in one example, the parent node receives a packet that includes the first logical channel identifier. As shown by reference 612, based at least in part on the packet including the first logical channel identifier, the parent node may process the packet according to the first backhaul configuration (i.e., the backhaul configuration received from the CU of the IAB donor 1 CU). That is, the parent node may determine that the logical channel identifier included in the packet matches the first logical channel identifier, may determine that the first logical channel identifier corresponds to the first backhaul RLC channel (which is associated with the first backhaul configuration), and may process the packet according to the first backhaul configuration.

As another example, as shown by reference 614, the parent node receives a packet that includes the second logical channel identifier. As shown by reference 616, based at least in part on the packet including the second logical channel identifier, the parent node may process the packet according to the second backhaul configuration (i.e., the backhaul configuration received from the CU of the IAB donor 2 CU). That is, the parent node may determine that the logical channel identifier included in the packet matches the second logical channel identifier, may determine that the second logical channel identifier corresponds to the second backhaul RLC channel (which is associated with the second backhaul configuration), and may process the packet according to the second backhaul configuration.

In this way, the logical channel identifier may be used to identify the backhaul configuration to be used by the parent node to process a given packet, thereby resolving the above-described ambiguities associated with BAP routing in an IAB network. More particularly, associating different logical channel identifiers with each backhaul configuration prevents routing ambiguities even in a case in which BAP addresses, BAP path identifiers, and/or backhaul RLC channel identifiers match between branches of an IAB network. For example, in some aspects, a backhaul RLC channel identifier of the first backhaul RLC channel (e.g., a backhaul RLC channel identifier selected by the IAB donor 1 CU in association with configuring the first backhaul RLC channel) may match a backhaul RLC channel identifier of the second backhaul RLC channel (e.g., a backhaul RLC channel identifier selected by the IAB donor 2 CU in association with configuring the second backhaul RLC channel). Here, the use of the first and second logical channel identifiers in the manner described resolves routing ambiguities that would otherwise be caused by the matching backhaul RLC channel identifiers.

In some aspects, the parent node may be an IAB donor, and processing the packet according to the identified backhaul configuration includes forwarding the packet to the CU of the appropriate IAB donor based at least in part on the packet carrying an address that matches an address indicated by the identified backhaul configuration. For example, when the parent node is an IAB donor and the packet includes the first logical channel identifier, processing the packet may include forwarding the packet to the IAB donor 1 CU based at least in part on the packet carrying an address that matches an address indicated by the first backhaul configuration. In this example, in some aspects, the second backhaul configuration may indicate a BAP address that matches the BAP address indicated by the first backhaul configuration (e.g., the BAP addresses of the next hops may be matching in the first and second configurations). Alternatively, in this example, the second backhaul configuration may indicate an address that is different from the address indicated by the first backhaul configuration (e.g., the BAP addresses of the next hops may be different in the first and second configurations).

In some aspects, the parent node may be an IAB donor, and processing the packet according to the identified backhaul configuration includes dropping or rerouting the packet based at least in part on the packet carrying an address that is different from an address indicated by the identified backhaul configuration. For example, when the parent node is an IAB donor and the packet includes the first logical channel identifier, processing the packet according to the first backhaul configuration may include dropping or rerouting the packet based at least in part on the packet carrying an address that is different from an address indicated by the first backhaul configuration. In this example, in some aspects, the second backhaul configuration may indicate an address that matches the address indicated by the first backhaul configuration.

In some aspects, processing the packet according to the identified backhaul configuration comprises forwarding the packet on a particular path based at least in part on a routing identifier carried in the packet and a routing configuration indicated by the identified backhaul configuration. For example, when the packet includes the first logical channel identifier, processing the packet according to the first backhaul configuration may include forwarding the packet on a first path based at least in part on a routing identifier carried in the packet and a routing configuration indicated by the first backhaul configuration. In this example, in some aspects, the second backhaul configuration may indicate a second path for the routing identifier carried in the packet.

In some aspects, the parent node may be an IAB node, and processing the packet according to the identified backhaul configuration includes mapping the packet to a first egress backhaul RLC channel at an MT of the parent node based at least in part on a backhaul RLC channel identifier of a first ingress backhaul RLC channel and a mapping configuration indicated by the first backhaul configuration. For example, when the parent node is an IAB node and the packet includes the first logical channel identifier, processing the packet according to the first backhaul configuration may include mapping the packet to a first egress backhaul RLC channel at an MT of the parent node based at least in part on a backhaul RLC channel identifier of a first ingress backhaul RLC channel (e.g., the ingress backhaul RLC channel on which the packet was received) and a mapping configuration indicated by the first backhaul configuration.

In this example, in some aspects, the second backhaul configuration may indicate a mapping between an ingress backhaul RLC channel identifier of an RLC channel at the DU of the parent node and an egress backhaul RLC channel identifier of an RLC channel at the MT of the parent node. Here, the ingress backhaul RLC channel identifier may be the same as the backhaul RLC channel identifier of the first ingress backhaul RLC channel, and the egress backhaul RLC channel identifier may be different from the backhaul RLC channel identifier of the first egress backhaul RLC channel In the above example, in another aspect, the second backhaul configuration may indicate a mapping between an ingress backhaul RLC channel identifier of an RLC channel at the DU of the parent node and a second egress backhaul RLC channel identifier of an egress RLC channel at the MT of the parent node. Here, the ingress backhaul RLC channel identifier may be the same as the backhaul RLC channel identifier of the first ingress backhaul RLC channel, and the egress backhaul RLC channel identifier may be the same as the backhaul RLC channel identifier of the first egress backhaul RLC channel. Further, the first egress backhaul RLC channel may be configured at the MT of the parent node by the CU of the first IAB donor, and the second egress backhaul RLC channel may be configured at the MT of the parent node by CU of the second IAB donor.

As indicated above, FIGS. 6A and 6B are provided as examples. Other examples may differ from what is described with respect to FIGS. 6A and 6B.

Figure 7A:
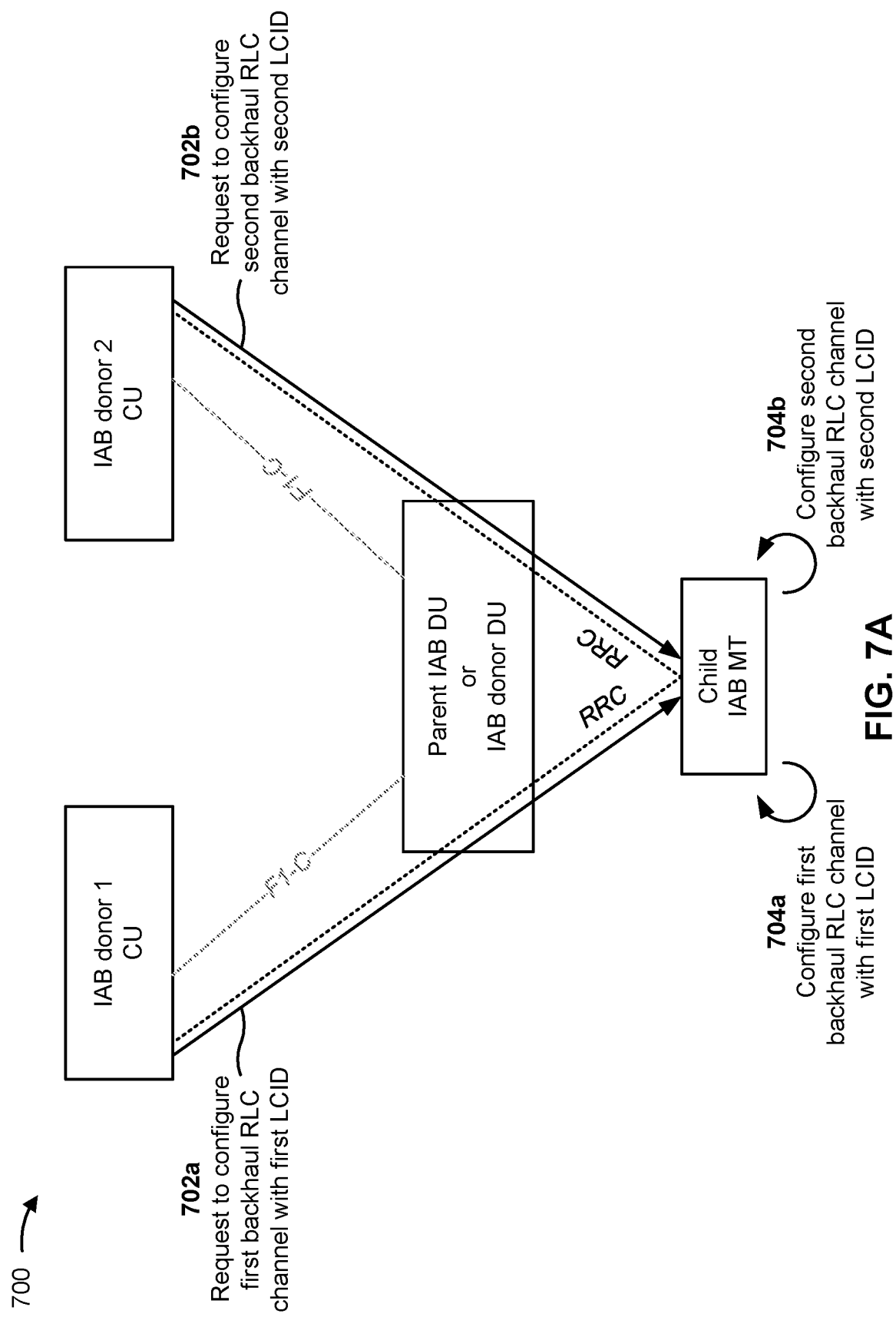
Figure 7B:
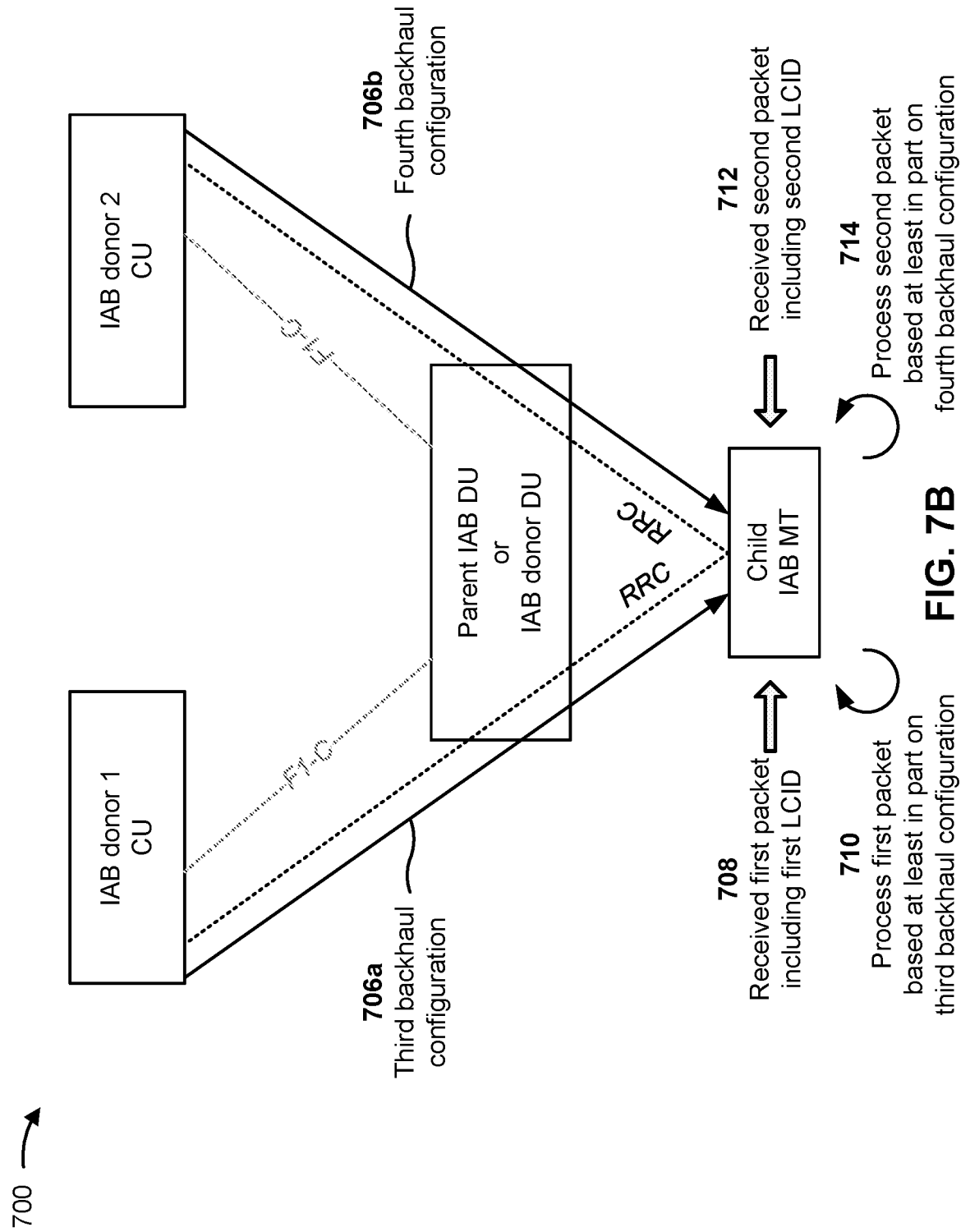

FIGS. 7A and 7B illustrate an example 700 illustrating operations performed by a child node in association with configuration of backhaul RLC channels and routing a packet.

As shown in FIG. 7A by reference 702a, the child node may receive, from the IAB donor 1 CU (e.g., on the signaling connection between the child node and the IAB donor 1 CU), a request (e.g., an RRC reconfiguration message) to set up a first backhaul RLC channel (e.g., the backhaul RLC channel between the parent node and the child node on the first branch). In some aspects, the request includes a backhaul RLC channel identifier (selected by the IAB donor 1 CU) and a first logical channel identifier (e.g., selected by a parent node of the child node) that are to be associated with the first backhaul RLC channel. In some aspects, the first logical channel identifier may be an extended logical channel identifier.

As shown by reference 704a, the child node may configure the first backhaul RLC channel at the MT based at least in part on the request. In some aspects, the child node may provide, to the IAB donor 1 CU, a response (e.g., an RRC reconfiguration complete message) indicating that the first backhaul RLC channel has been configured according to the request.

As shown in FIG. 7B by reference 706a, the child node may receive, from the IAB donor 1 CU (e.g., on the signaling connection between the child node and the IAB donor 1 CU), a third backhaul configuration. In this example, the third backhaul configuration is a backhaul configuration to be used by the child node when routing packets on the first branch of the IAB network. The third backhaul configuration may include, for example, a BAP address assigned to the child node on the first branch, a routing configuration associated with the first branch (e.g., information associated with mapping of an ingress link to an egress link), a mapping configuration associated with the first branch (e.g., uplink mapping information, downlink mapping information, and/or ingress-to-egress backhaul RLC channel mapping information), and/or another type of information.

Returning to FIG. 7A, with respect to the IAB donor 2 CU and as shown by reference 702b, the child node may receive, from the IAB donor 2 CU (e.g., on the signaling connection between the child node and the IAB donor 1 CU), a request (e.g., an RRC reconfiguration message) to set up a second backhaul RLC channel (e.g., the backhaul RLC channel between the parent node and the child node on the second branch). In some aspects, the request includes a backhaul RLC channel identifier (selected by the IAB donor 2 CU) and a second logical channel identifier (e.g., selected by a parent node of the child node) that are to be associated with the second backhaul RLC channel. In some aspects, the second logical channel identifier may be an extended logical channel identifier. Here, as described above, the second logical channel identifier should be different from the first logical channel identifier.

As shown by reference 704b, the child node may configure the second backhaul RLC channel at the MT based at least in part on the request. In some aspects, the child node may provide, to the IAB donor 2 CU, a response (e.g., an RRC reconfiguration complete message) indicating that the second backhaul RLC channel has been configured according to the request.

As shown in FIG. 7B, by reference 706b, the child node may receive, from the IAB donor 2 CU (e.g., on the signaling connection between the child node and the IAB donor 2 CU), a fourth backhaul configuration. In this example, the fourth backhaul configuration is a backhaul configuration to be used by the child node when routing packets on the second branch of the IAB network. The fourth backhaul configuration may include, for example, a BAP address assigned to the child node on the first branch, a routing configuration associated with the second branch (e.g., information associated with mapping of an ingress link to an egress link), a mapping configuration associated with the second branch (e.g., uplink mapping information, downlink mapping information, and/or ingress-to-egress backhaul RLC channel mapping information), and/or another type of information.

In some aspects, after configuration of the first and second backhaul RLC channels, the child node may receive a packet at the MT of the child node. In some aspects, the packet may include a logical channel identifier associated with a backhaul RLC channel configured on the child node. In the context of example 700, the packet may include the first logical channel identifier or may include the second logical channel identifier. Thus, upon receiving a packet, the child node may determine whether the packet includes the first logical channel identifier (i.e., the logical channel identifier that corresponds to the first backhaul RLC channel associated with the first branch) or includes the second logical channel identifier (i.e., the logical channel identifier that corresponds to the second backhaul RLC channel associated with the second branch).

As shown by reference 708, in one example, the child node receives a packet that includes the first logical channel identifier. As shown by reference 710, based at least in part on the packet including the first logical channel identifier, the child node may process the packet according to the first backhaul configuration (i.e., the backhaul configuration received from the CU of the IAB donor 1 CU). That is, the child node may determine that the logical channel identifier included in the packet matches the first logical channel identifier, may determine that the first logical channel identifier corresponds to the first backhaul RLC channel (which is associated with the first backhaul configuration), and may process the packet according to the first backhaul configuration.

As another example, as shown by reference 712, the child node receives a packet that includes the second logical channel identifier. As shown by reference 714, based at least in part on the packet including the second logical channel identifier, the child node may process the packet according to the second backhaul configuration (i.e., the backhaul configuration received from the CU of the IAB donor 2 CU). That is, the child node may determine that the logical channel identifier included in the packet matches the second logical channel identifier, may determine that the second logical channel identifier corresponds to the second backhaul RLC channel (which is associated with the second backhaul configuration), and may process the packet according to the second backhaul configuration.

In this way, the logical channel identifier may be used to identify the backhaul configuration to be used by the child node to process a given packet, thereby resolving the above-described ambiguities associated with BAP routing in an IAB network. More particularly, associating different logical channel identifiers with each backhaul configuration prevents routing ambiguities even in a case in which BAP addresses, BAP path identifiers, and/or backhaul RLC channel identifiers match between branches of an IAB network. For example, in some aspects, a backhaul RLC channel identifier of the first backhaul RLC channel (e.g., a backhaul RLC channel identifier selected by the IAB donor 1 CU in association with configuring the first backhaul RLC channel) may match a backhaul RLC channel identifier of the second backhaul RLC channel (e.g., a backhaul RLC channel identifier selected by the IAB donor 2 CU in association with configuring the second backhaul RLC channel). Here, the use of the first and second logical channel identifiers in the manner described resolves routing ambiguities that would otherwise be caused by the matching backhaul RLC channel identifiers.

In some aspects, processing the packet according to the identified backhaul configuration includes forwarding the packet to upper layer processing based at least in part on the packet carrying an address that matches an address indicated by the identified backhaul configuration. For example, when the packet includes the first logical channel identifier, processing the packet according to the first backhaul configuration may include the packet to upper layer processing based at least in part on the packet carrying an address that matches an address indicated by the first backhaul configuration. In this example, in some aspects, the second backhaul configuration may indicate a different address than the address indicated by the first backhaul configuration.

In some aspects, processing the packet according to the identified backhaul configuration includes forwarding the packet on an egress link to another node based at least in part on the packet carrying an address that is different from an address indicated by the identified backhaul configuration. For example, when the packet includes the first logical channel identifier, processing the packet according to the first backhaul configuration may include forwarding the packet on an egress link to another node based at least in part on the packet carrying an address that is different from an address indicated by the first backhaul configuration. In this example, in some aspects, the second backhaul configuration indicates an address that matches the address carried in the packet.

In some aspects, processing the packet according to the identified backhaul configuration includes forwarding the packet on a particular path based at least in part on a routing identifier carried in the packet and a routing configuration indicated by the identified backhaul configuration. For example, when the packet includes the first logical channel identifier, processing the packet according to the first backhaul configuration comprises forwarding the packet on a first path based at least in part on a routing identifier carried in the packet and a routing configuration indicated by the first backhaul configuration. In this example, in some aspects, the second backhaul configuration may indicate a second path for the routing identifier carried in the packet.

In some aspects, processing the packet according to the identified backhaul configuration includes mapping the packet to a particular egress backhaul RLC channel at a DU of the child node based at least in part on a backhaul RLC channel identifier of a particular ingress backhaul RLC channel and a mapping configuration indicated by the identified backhaul configuration. For example, when the packet includes the first logical channel identifier, processing the packet according to the first backhaul configuration may include mapping the packet to a first egress backhaul RLC channel at a DU of the child node based at least in part on a backhaul RLC channel identifier of a first ingress backhaul RLC channel and a mapping configuration indicated by the first backhaul configuration.

In this example, in some aspects, the second backhaul configuration may indicate a mapping between an ingress backhaul RLC channel identifier of an RLC channel at the MT of the child node and an egress backhaul RLC channel identifier of an RLC channel at the DU of the child node. Here, the ingress backhaul RLC channel identifier may be the same as the backhaul RLC channel identifier of the first ingress backhaul RLC channel, and the egress backhaul RLC channel identifier may be different from the backhaul RLC channel identifier of the first egress backhaul RLC channel.

In the above example, in another aspect, the second backhaul configuration may indicate a mapping between an ingress backhaul RLC channel identifier of an RLC channel at the MT of the child node and an egress backhaul RLC channel identifier of a second egress RLC channel at the DU of the child node. Here, the ingress backhaul RLC channel identifier may be the same as the backhaul RLC channel identifier of the first ingress backhaul RLC channel, and the egress backhaul RLC channel identifier may be the same as the backhaul RLC channel identifier of the first egress backhaul RLC channel. Further, the first egress backhaul RLC channel may be configured at the DU of the child node by the CU of the first IAB donor, and the second egress backhaul RLC channel is configured at the DU of the child node by CU of the second IAB donor.

As indicated above, FIGS. 7A and 7B are provided as examples. Other examples may differ from what is described with respect to FIGS. 7A and 7B.

Figure 8:
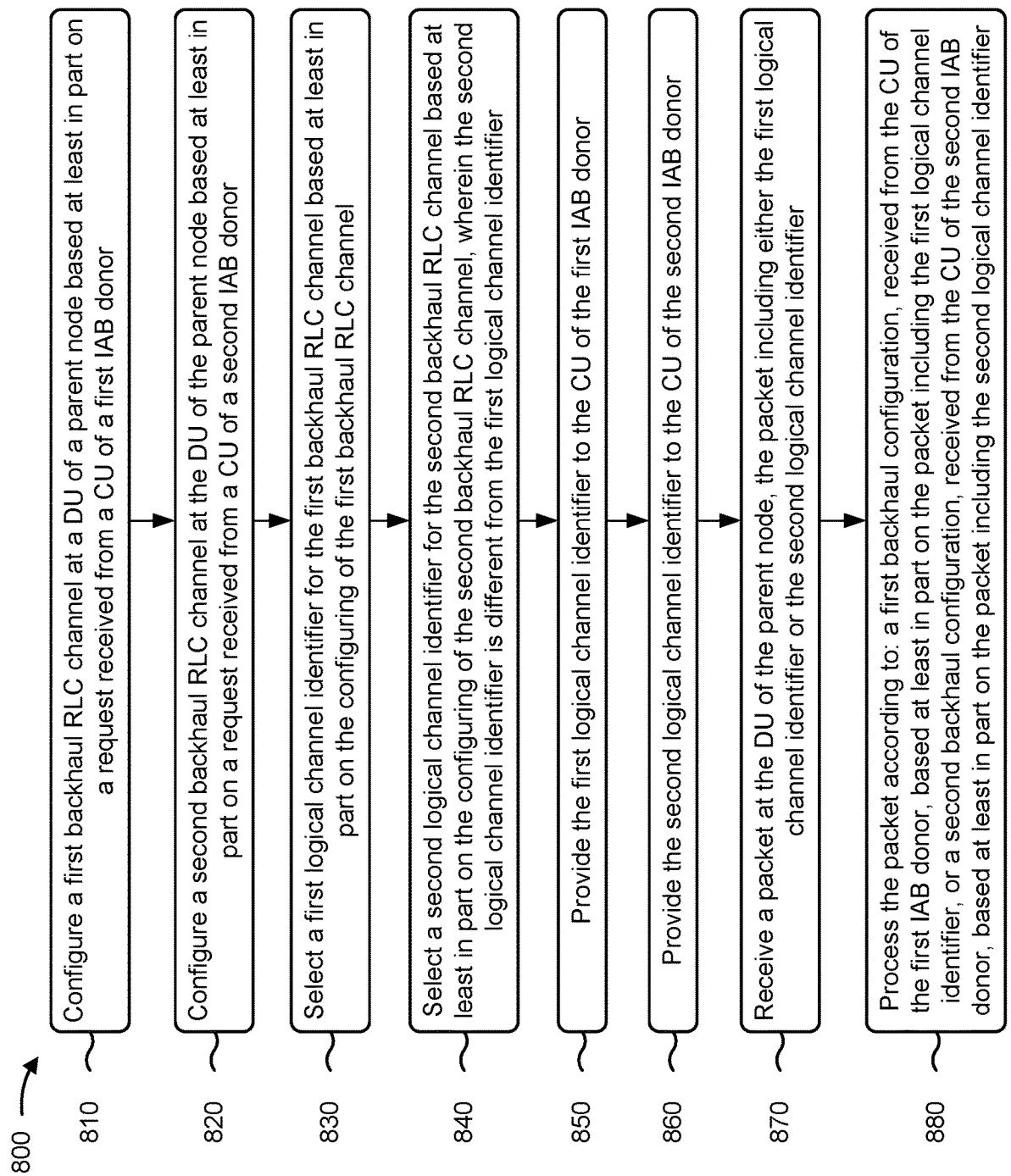

FIG. 8 is a diagram illustrating an example process 800 performed, for example, by a parent node, in accordance with the present disclosure. Example process 800 is an example where the parent node (e.g., base station 110, TAB donor 405, and/or TAB node 410) performs operations associated with transport layer separation in an TAB network.

As shown in FIG. 8, in some aspects, process 800 may include configuring a first backhaul RLC channel at a DU of the parent node based at least in part on a request received from a CU of a first TAB donor (block 810). For example, the parent node (e.g., using transmit processor 220, receive processor 238, controller/processor 240, and/or memory 242) may configure a first backhaul RLC channel at a DU of the parent node based at least in part on a request received from a CU of a first TAB donor, as described above.

As further shown in FIG. 8, in some aspects, process 800 may include configuring a second backhaul RLC channel at the DU of the parent node based at least in part on a request received from a CU of a second TAB donor (block 820). For example, the parent node (e.g., using transmit processor 220, receive processor 238, controller/processor 240, and/or memory 242) may configure a second backhaul RLC channel at the DU of the parent node based at least in part on a request received from a CU of a second TAB donor, as described above.

As further shown in FIG. 8, in some aspects, process 800 may include selecting a first logical channel identifier for the first backhaul RLC channel based at least in part on the configuring of the first backhaul RLC channel (block 830). For example, the parent node (e.g., using transmit processor 220, receive processor 238, controller/processor 240, and/or memory 242) may select a first logical channel identifier for the first backhaul RLC channel based at least in part on the configuring of the first backhaul RLC channel, as described above.

As further shown in FIG. 8, in some aspects, process 800 may include selecting a second logical channel identifier for the second backhaul RLC channel based at least in part on the configuring of the second backhaul RLC channel, wherein the second logical channel identifier is different from the first logical channel identifier (block 840). For example, the parent node (e.g., using transmit processor 220, receive processor 238, controller/processor 240, and/or memory 242) may select a second logical channel identifier for the second backhaul RLC channel based at least in part on the configuring of the second backhaul RLC channel, as described above. In some aspects, the second logical channel identifier is different from the first logical channel identifier.

As further shown in FIG. 8, in some aspects, process 800 may include providing the first logical channel identifier to the CU of the first IAB donor (block 850). For example, the parent node (e.g., using transmit processor 220, receive processor 238, controller/processor 240, and/or memory 242) may provide the first logical channel identifier to the CU of the first IAB donor, as described above.

As further shown in FIG. 8, in some aspects, process 800 may include providing the second logical channel identifier to the CU of the second IAB donor (block 860). For example, the parent node (e.g., using transmit processor 220, receive processor 238, controller/processor 240, and/or memory 242) may provide the second logical channel identifier to the CU of the second IAB donor, as described above.

As further shown in FIG. 8, in some aspects, process 800 may include receiving a packet at the DU of the parent node, the packet including either the first logical channel identifier or the second logical channel identifier (block 870). For example, the parent node (e.g., using transmit processor 220, receive processor 238, controller/processor 240, and/or memory 242) may receive a packet at the DU of the parent node, the packet including either the first logical channel identifier or the second logical channel identifier, as described above.

As further shown in FIG. 8, in some aspects, process 800 may include processing the packet according to: a first backhaul configuration, received from the CU of the first IAB donor, based at least in part on the packet including the first logical channel identifier, or a second backhaul configuration, received from the CU of the second IAB donor, based at least in part on the packet including the second logical channel identifier (block 880). For example, the parent node (e.g., using transmit processor 220, receive processor 238, controller/processor 240, and/or memory 242) may process the packet according to: a first backhaul configuration, received from the CU of the first IAB donor, based at least in part on the packet including the first logical channel identifier, or a second backhaul configuration, received from the CU of the second IAB donor, based at least in part on the packet including the second logical channel identifier, as described above.

Process 800 may include additional aspects, such as any single aspect or any combination of aspects described below and/or in connection with one or more other processes described elsewhere herein.

In a first aspect, the DU of the parent node is a DU of an IAB node.

In a second aspect, alone or in combination with the first aspect, the DU of the parent node is a DU of an IAB donor.

In a third aspect, alone or in combination with one or more of the first and second aspects, the parent node has a first signaling connection to the CU of the first IAB donor and has a second signaling connection to the CU of the second IAB donor.

In a fourth aspect, alone or in combination with one or more of the first through third aspects, at least one of the first signaling connection or the second signaling connection is a radio resource control (RRC) connection or a connection over an F1 interface.

In a fifth aspect, alone or in combination with one or more of the first through fourth aspects, a backhaul RLC channel identifier of the first backhaul RLC channel matches a backhaul RLC channel identifier of the second backhaul RLC channel.

In a sixth aspect, alone or in combination with one or more of the first through fifth aspects, at least one of the first logical channel identifier or the second logical channel identifier is an extended logical channel identifier.

In a seventh aspect, alone or in combination with one or more of the first through sixth aspects, the parent node is an IAB donor, and processing the packet according to the first backhaul configuration comprises forwarding the packet to the CU of the first IAB donor based at least in part on the packet carrying an address that matches an address indicated by the first backhaul configuration.

In an eighth aspect, alone or in combination with one or more of the first through seventh aspects, the second backhaul configuration indicates an address that matches the address indicated by the first backhaul configuration.

In a ninth aspect, alone or in combination with one or more of the first through eighth aspects, the second backhaul configuration indicates an address that is different from the address indicated by the first backhaul configuration.

In a tenth aspect, alone or in combination with one or more of the first through ninth aspects, the parent node is an IAB donor, and processing the packet according to the first backhaul configuration comprises dropping or rerouting the packet based at least in part on the packet carrying an address that is different from an address indicated by the first backhaul configuration.

In an eleventh aspect, alone or in combination with one or more of the first through tenth aspects, the second backhaul configuration indicates an address that matches the address indicated by the first backhaul configuration.

In a twelfth aspect, alone or in combination with one or more of the first through eleventh aspects, processing the packet according to the first backhaul configuration comprises forwarding the packet on a first path based at least in part on a routing identifier carried in the packet and a routing configuration indicated by the first backhaul configuration.

In a thirteenth aspect, alone or in combination with one or more of the first through twelfth aspects, the second backhaul configuration indicates a second path for the routing identifier carried in the packet.

In a fourteenth aspect, alone or in combination with one or more of the first through thirteenth aspects, the parent node is an IAB node, and processing the packet according to the first backhaul configuration comprises mapping the packet to a first egress backhaul RLC channel at an MT of the parent node based at least in part on a first backhaul RLC channel identifier corresponding to the first logical channel and a mapping configuration indicated by the first backhaul configuration.

In a fifteenth aspect, alone or in combination with one or more of the first through fourteenth aspects, the second backhaul configuration indicates a mapping between an ingress backhaul RLC channel identifier of an RLC channel at the DU of the parent node and an egress backhaul RLC channel identifier of an RLC channel at the MT of the parent node, the ingress backhaul RLC channel identifier is the same as the first backhaul RLC channel identifier corresponding to the first logical channel, and the egress backhaul RLC channel identifier is different from the backhaul RLC channel identifier of the first egress backhaul RLC channel.

In a sixteenth aspect, alone or in combination with one or more of the first through fifteenth aspects, the second backhaul configuration indicates a mapping between an ingress backhaul RLC channel identifier of an RLC channel at the DU of the parent node and a second egress backhaul RLC channel identifier of an egress RLC channel at the MT of the parent node, the ingress backhaul RLC channel identifier is the same as the first backhaul RLC channel identifier corresponding to the first logical channel, the egress backhaul RLC channel identifier is the same as the backhaul RLC channel identifier of the first egress backhaul RLC channel, the first egress backhaul RLC channel is configured at the MT of the parent node by the CU of the first IAB donor, and the second egress backhaul RLC channel is configured at the MT of the parent node by CU of the second IAB donor.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a child node, in accordance with the present disclosure. Example process 900 is an example where the child node (e.g., base station 110, and/or IAB node 410) performs operations associated with transport layer separation in an IAB network.

As shown in FIG. 9, in some aspects, process 900 may include configuring a first backhaul RLC channel with a first logical channel identifier at an MT of the child node, wherein the first backhaul RLC channel is configured based at least in part on a request received from a CU of a first IAB donor (block 910). For example, the child node (e.g., using transmit processor 220, receive processor 238, controller/processor 240, and/or memory 242) may configure a first backhaul RLC channel with a first logical channel identifier at an MT of the child node, as described above. In some aspects, the first backhaul RLC channel is configured based at least in part on a request received from a CU of a first IAB donor.

As further shown in FIG. 9, in some aspects, process 900 may include configuring a second backhaul RLC channel with a second logical channel identifier at the MT of the child node, wherein the second backhaul RLC channel is configured based at least in part on a request received from a CU of a second IAB donor, and wherein the first logical channel identifier is different from the second logical channel identifier (block 920). For example, the child node (e.g., using transmit processor 220, receive processor 238, controller/processor 240, and/or memory 242) may configure a second backhaul RLC channel with a second logical channel identifier at the MT of the child node, as described above. In some aspects, the second backhaul RLC channel is configured based at least in part on a request received from a CU of a second IAB donor. In some aspects, the first logical channel identifier is different from the second logical channel identifier.

As further shown in FIG. 9, in some aspects, process 900 may include receiving a packet at the MT of the child node, the packet including either the first logical channel identifier or the second logical channel identifier (block 930). For example, the child node (e.g., using transmit processor 220, receive processor 238, controller/processor 240, and/or memory 242) may receive a packet at the MT of the child node, the packet including either the first logical channel identifier or the second logical channel identifier, as described above.

As further shown in FIG. 9, in some aspects, process 900 may include processing the packet according to a first backhaul configuration, received from the CU of the first IAB donor, based at least in part on the packet including the first logical channel identifier, or a second backhaul configuration, received from the CU of the second IAB donor, based at least in part on the packet including the second logical channel identifier (block 940). For example, the child node (e.g., using transmit processor 220, receive processor 238, controller/processor 240, and/or memory 242) may process the packet according to a first backhaul configuration, received from the CU of the first IAB donor, based at least in part on the packet including the first logical channel identifier, or a second backhaul configuration, received from the CU of the second IAB donor, based at least in part on the packet including the second logical channel identifier, as described above.

Process 900 may include additional aspects, such as any single aspect or any combination of aspects described below and/or in connection with one or more other processes described elsewhere herein.

In a first aspect, the MT of the child node is radio resource control connected to the CU of the first IAB donor and to the CU of the second IAB donor.

In a second aspect, alone or in combination with the first aspect, the MT of the child node comprises a first MT that is radio resource control (RRC) connected to the CU of the first IAB donor and a second MT that is RRC connected to the CU of the second IAB donor.

In a third aspect, alone or in combination with one or more of the first and second aspects, the child node has a first signaling connection to the CU of the first IAB donor and has a second signaling connection to the CU of the second IAB donor.

In a fourth aspect, alone or in combination with one or more of the first through third aspects, at least one of the first signaling connection or the second signaling connection is an RRC connection or a connection over an F1 interface.

In a fifth aspect, alone or in combination with one or more of the first through fourth aspects, a backhaul RLC channel identifier of the first backhaul RLC channel matches a backhaul RLC channel identifier of the second backhaul RLC channel.

In a sixth aspect, alone or in combination with one or more of the first through fifth aspects, at least one of the first logical channel identifier or the second logical channel identifier is an extended logical channel identifier.

In a seventh aspect, alone or in combination with one or more of the first through sixth aspects, processing the packet according to the first backhaul configuration comprises forwarding the packet to higher layer processing based at least in part on the packet carrying an address that matches an address indicated by the first backhaul configuration.

In an eighth aspect, alone or in combination with one or more of the first through seventh aspects, the second backhaul configuration indicates a different address than the address indicated by the first backhaul configuration.

In a ninth aspect, alone or in combination with one or more of the first through eighth aspects, processing the packet according to the first backhaul configuration comprises forwarding the packet on an egress link to another node based at least in part on the packet carrying an address that is different from an address indicated by the first backhaul configuration.

In a tenth aspect, alone or in combination with one or more of the first through ninth aspects, the second backhaul configuration indicates an address that matches the address carried in the packet.

In an eleventh aspect, alone or in combination with one or more of the first through tenth aspects, processing the packet according to the first backhaul configuration comprises forwarding the packet on a first path based at least in part on a routing identifier carried in the packet and a routing configuration indicated by the first backhaul configuration.

In a twelfth aspect, alone or in combination with one or more of the first through eleventh aspects, the second backhaul configuration indicates a second path for the routing identifier carried in the packet.

In a thirteenth aspect, alone or in combination with one or more of the first through twelfth aspects, processing the packet according to the first backhaul configuration comprises mapping the packet to a first egress backhaul RLC channel at a DU of the child node based at least in part on a first backhaul RLC channel identifier corresponding to the first logical channel and a mapping configuration indicated by the first backhaul configuration.

In a fourteenth aspect, alone or in combination with one or more of the first through thirteenth aspects, the second backhaul configuration indicates a mapping between an ingress backhaul RLC channel identifier of an RLC channel at the MT of the child node and an egress backhaul RLC channel identifier of an RLC channel at the DU of the child node, the ingress backhaul RLC channel identifier is the same as the backhaul RLC channel identifier of the first ingress backhaul RLC channel, and the egress backhaul RLC channel identifier is different from the backhaul RLC channel identifier of the first egress backhaul RLC channel.

In a fifteenth aspect, alone or in combination with one or more of the first through fourteenth aspects, the second backhaul configuration indicates a mapping between an ingress backhaul RLC channel identifier of an RLC channel at the MT of the child node and an egress backhaul RLC channel identifier of a second egress RLC channel at the DU of the child node, the ingress backhaul RLC channel identifier is the same as the backhaul RLC channel identifier of the first ingress backhaul RLC channel, the egress backhaul RLC channel identifier is the same as the backhaul RLC channel identifier of the first egress backhaul RLC channel, the first egress backhaul RLC channel is configured at the DU of the child node by the CU of the first IAB donor, and the second egress backhaul RLC channel is configured at the DU of the child node by CU of the second IAB donor.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The following provides an overview of some Aspects of the present disclosure:

Aspect 1: A method of wireless communication performed by a parent node, comprising: configuring a first backhaul radio link control (RLC) channel at a distributed unit (DU) of the parent node based at least in part on a request received from a central unit (CU) of a first integrated access and backhaul (IAB) donor; configuring a second backhaul RLC channel at the DU of the parent node based at least in part on a request received from a CU of a second IAB donor; selecting a first logical channel identifier for the first backhaul RLC channel based at least in part on the configuring of the first backhaul RLC channel; selecting a second logical channel identifier for the second backhaul RLC channel based at least in part on the configuring of the second backhaul RLC channel, wherein the second logical channel identifier is different from the first logical channel identifier; providing the first logical channel identifier to the CU of the first IAB donor; providing the second logical channel identifier to the CU of the second IAB donor; receiving a packet at the DU of the parent node, the packet including either the first logical channel identifier or the second logical channel identifier; and processing the packet according to: a first backhaul configuration, received from the CU of the first IAB donor, based at least in part on the packet including the first logical channel identifier, or a second backhaul configuration, received from the CU of the second IAB donor, based at least in part on the packet including the second logical channel identifier.

Aspect 2: The method of Aspect 1, wherein: the DU of the parent node is a DU of an IAB node; or the DU of the parent node is a DU of an IAB donor.

Aspect 3: The method of any of Aspects 1 through 2, wherein the parent node has a first signaling connection to the CU of the first IAB donor and has a second signaling connection to the CU of the second IAB donor, and wherein at least one of the first signaling connection or the second signaling connection is a radio resource control (RRC) connection or a connection over an F1 interface.

Aspect 4: The method of any of Aspects 1 through 3, wherein a backhaul RLC channel identifier of the first backhaul RLC channel matches a backhaul RLC channel identifier of the second backhaul RLC channel.

Aspect 5: The method of any of Aspects 1 through 4, wherein at least one of the first logical channel identifier or the second logical channel identifier is an extended logical channel identifier.

Aspect 6: The method of any of Aspects 1 through 5, wherein the parent node is an IAB donor, and processing the packet according to the first backhaul configuration comprises forwarding the packet to the CU of the first IAB donor based at least in part on the packet carrying an address that matches an address indicated by the first backhaul configuration, and wherein the second backhaul configuration indicates an address that matches the address indicated by the first backhaul configuration.

Aspect 7: The method of any of Aspects 1 through 6, wherein processing the packet according to the first backhaul configuration comprises forwarding the packet on a first path based at least in part on a routing identifier carried in the packet and a routing configuration indicated by the first backhaul configuration, and wherein the second backhaul configuration indicates a second path for the routing identifier carried in the packet.

Aspect 8: The method of any of Aspects 1 through 7, wherein the parent node is an IAB node, and processing the packet according to the first backhaul configuration comprises mapping the packet to a first egress backhaul RLC channel at a mobile termination function (MT) of the parent node based at least in part on a first backhaul RLC channel identifier corresponding to the first logical channel and a mapping configuration indicated by the first backhaul configuration.

Aspect 9: The method of Aspect 8, wherein the second backhaul configuration indicates a mapping between an ingress backhaul RLC channel identifier of an RLC channel at the DU of the parent node and an egress backhaul RLC channel identifier of an RLC channel at the MT of the parent node, wherein the ingress backhaul RLC channel identifier is the same as the first backhaul RLC channel identifier corresponding to the first logical channel, and wherein the egress backhaul RLC channel identifier is different from the backhaul RLC channel identifier of the first egress backhaul RLC channel Aspect 10: The method of Aspect 8, wherein the second backhaul configuration indicates a mapping between an ingress backhaul RLC channel identifier of an RLC channel at the DU of the parent node and a second egress backhaul RLC channel identifier of an egress RLC channel at the MT of the parent node, where the ingress backhaul RLC channel identifier is the same as the first backhaul RLC channel identifier corresponding to the first logical channel, wherein the egress backhaul RLC channel identifier is the same as the backhaul RLC channel identifier of the first egress backhaul RLC channel, wherein the first egress backhaul RLC channel is configured at the MT of the parent node by the CU of the first IAB donor, and wherein the second egress backhaul RLC channel is configured at the MT of the parent node by CU of the second IAB donor.

Aspect 11: A method of wireless communication performed by a child node, comprising: configuring a first backhaul radio link control (RLC) channel with a first logical channel identifier at a mobile termination function (MT) of the child node, wherein the first backhaul RLC channel is configured based at least in part on a request received from a central unit (CU) of a first integrated access and backhaul (IAB) donor; configuring a second backhaul RLC channel with a second logical channel identifier at the MT of the child node, wherein the second backhaul RLC channel is configured based at least in part on a request received from a CU of a second IAB donor, and wherein the first logical channel identifier is different from the second logical channel identifier; receiving a packet at the MT of the child node, the packet including either the first logical channel identifier or the second logical channel identifier; and processing the packet according to: a first backhaul configuration, received from the CU of the first IAB donor, based at least in part on the packet including the first logical channel identifier, or a second backhaul configuration, received from the CU of the second IAB donor, based at least in part on the packet including the second logical channel identifier.

Aspect 12: The method of Aspect 11, wherein the MT of the child node is radio resource control connected to the CU of the first IAB donor and to the CU of the second IAB donor.

Aspect 13: The method of any of Aspects 11 through 12, wherein the MT of the child node comprises a first MT that is radio resource control (RRC) connected to the CU of the first IAB donor and a second MT that is RRC connected to the CU of the second IAB donor.

Aspect 14: The method of any of Aspects 11 through 13, wherein the child node has a first signaling connection to the CU of the first IAB donor and has a second signaling connection to the CU of the second IAB donor, and wherein at least one of the first signaling connection or the second signaling connection is a radio resource control (RRC) connection or a connection over an F1 interface.

Aspect 15: The method of any of Aspects 11 through 14, wherein a backhaul RLC channel identifier of the first backhaul RLC channel matches a backhaul RLC channel identifier of the second backhaul RLC channel.

Aspect 16: The method of any of Aspects 11 through 15, wherein at least one of the first logical channel identifier or the second logical channel identifier is an extended logical channel identifier.

Aspect 17: The method of any of Aspects 11 through 16, wherein processing the packet according to the first backhaul configuration comprises forwarding the packet to higher layer processing based at least in part on the packet carrying an address that matches an address indicated by the first backhaul configuration, and wherein the second backhaul configuration indicates a different address than the address indicated by the first backhaul configuration.

Aspect 18: The method of any of Aspects 11 through 17, wherein processing the packet according to the first backhaul configuration comprises forwarding the packet on an egress link to another node based at least in part on the packet carrying an address that is different from an address indicated by the first backhaul configuration.

Aspect 19: The method of any of Aspects 11 through 18, wherein processing the packet according to the first backhaul configuration comprises forwarding the packet on a first path based at least in part on a routing identifier carried in the packet and a routing configuration indicated by the first backhaul configuration, and wherein the second backhaul configuration indicates a second path for the routing identifier carried in the packet.

Aspect 20: The method of any of Aspects 11 through 19, wherein processing the packet according to the first backhaul configuration comprises mapping the packet to a first egress backhaul RLC channel at a distributed unit (DU) of the child node based at least in part on a first backhaul RLC channel identifier corresponding to the first logical channel and a mapping configuration indicated by the first backhaul configuration.

Aspect 21: The method of Aspect 20, wherein the second backhaul configuration indicates a mapping between an ingress backhaul RLC channel identifier of an RLC channel at the MT of the child node and an egress backhaul RLC channel identifier of an RLC channel at the DU of the child node, wherein the ingress backhaul RLC channel identifier is the same as the first backhaul RLC channel identifier corresponding to the first logical channel, and wherein the egress backhaul RLC channel identifier is different from the backhaul RLC channel identifier of the first egress backhaul RLC channel.

Aspect 22: The method of Aspect 20, wherein the second backhaul configuration indicates a mapping between an ingress backhaul RLC channel identifier of an RLC channel at the MT of the child node and an egress backhaul RLC channel identifier of a second egress RLC channel at the DU of the child node, where the ingress backhaul RLC channel identifier is the same as the first backhaul RLC channel identifier corresponding to the first logical channel, wherein the egress backhaul RLC channel identifier is the same as the backhaul RLC channel identifier of the first egress backhaul RLC channel, wherein the first egress backhaul RLC channel is configured at the DU of the child node by the CU of the first IAB donor, and wherein the second egress backhaul RLC channel is configured at the DU of the child node by CU of the second IAB donor.

Aspect 23: An apparatus for wireless communication at a device, comprising a processor; memory coupled with the processor; and instructions stored in the memory and executable by the processor to cause the apparatus to perform the method of one or more of Aspects 1-10.

Aspect 24: A device for wireless communication, comprising a memory and one or more processors coupled to the memory, the one or more processors configured to perform the method of one or more of Aspects 1-10.

Aspect 25: An apparatus for wireless communication, comprising at least one means for performing the method of one or more of Aspects 1-10.

Aspect 26: A non-transitory computer-readable medium storing code for wireless communication, the code comprising instructions executable by a processor to perform the method of one or more of Aspects 1-10.

Aspect 27: A non-transitory computer-readable medium storing a set of instructions for wireless communication, the set of instructions comprising one or more instructions that, when executed by one or more processors of a device, cause the device to perform the method of one or more of Aspects 1-10.

Aspect 28: An apparatus for wireless communication at a device, comprising a processor; memory coupled with the processor; and instructions stored in the memory and executable by the processor to cause the apparatus to perform the method of one or more of Aspects 11-22.

Aspect 29: A device for wireless communication, comprising a memory and one or more processors coupled to the memory, the one or more processors configured to perform the method of one or more of Aspects 11-22.

Aspect 30: An apparatus for wireless communication, comprising at least one means for performing the method of one or more of Aspects 11-22.

Aspect 31: A non-transitory computer-readable medium storing code for wireless communication, the code comprising instructions executable by a processor to perform the method of one or more of Aspects 11-22.

Aspect 32: A non-transitory computer-readable medium storing a set of instructions for wireless communication, the set of instructions comprising one or more instructions that, when executed by one or more processors of a device, cause the device to perform the method of one or more of Aspects 11-22.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a parent node, comprising:
configuring a first backhaul radio link control (RLC) channel at a distributed unit (DU) of the parent node based at least in part on a request received from a central unit (CU) of a first integrated access and backhaul (IAB) donor;
configuring a second backhaul RLC channel at the DU of the parent node based at least in part on a request received from a CU of a second IAB donor;
selecting a first logical channel identifier for the first backhaul RLC channel based at least in part on the configuring of the first backhaul RLC channel;
selecting a second logical channel identifier for the second backhaul RLC channel based at least in part on the configuring of the second backhaul RLC channel, wherein the second logical channel identifier is different from the first logical channel identifier;
providing the first logical channel identifier to the CU of the first IAB donor;
providing the second logical channel identifier to the CU of the second IAB donor;
receiving a packet at the DU of the parent node, the packet including either the first logical channel identifier or the second logical channel identifier; and
processing the packet according to:
a first backhaul configuration, received from the CU of the first IAB donor, based at least in part on the packet including the first logical channel identifier, or
a second backhaul configuration, received from the CU of the second IAB donor, based at least in part on the packet including the second logical channel identifier.

2. The method of claim 1, wherein:
the DU of the parent node is a DU of an IAB node; or
the DU of the parent node is a DU of an IAB donor.

3. The method of claim 1, wherein the parent node has a first signaling connection to the CU of the first IAB donor and has a second signaling connection to the CU of the second IAB donor, and wherein at least one of the first signaling connection or the second signaling connection is a radio resource control (RRC) connection or a connection over an F1 interface.

4. The method of claim 1, wherein a backhaul RLC channel identifier of the first backhaul RLC channel matches a backhaul RLC channel identifier of the second backhaul RLC channel.

5. The method of claim 1, wherein at least one of the first logical channel identifier or the second logical channel identifier is an extended logical channel identifier.

6. The method of claim 1, wherein the parent node is an IAB donor, and processing the packet according to the first backhaul configuration comprises forwarding the packet to the CU of the first IAB donor based at least in part on the packet carrying an address that matches an address indicated by the first backhaul configuration, and wherein the second backhaul configuration indicates an address that matches the address indicated by the first backhaul configuration.

7. The method of claim 1, wherein processing the packet according to the first backhaul configuration comprises forwarding the packet on a first path based at least in part on a routing identifier carried in the packet and a routing configuration indicated by the first backhaul configuration, and wherein the second backhaul configuration indicates a second path for the routing identifier carried in the packet.

8. The method of claim 1, wherein the parent node is an IAB node, and processing the packet according to the first backhaul configuration comprises mapping the packet to a first egress backhaul RLC channel at a mobile termination function (MT) of the parent node based at least in part on a first backhaul RLC channel identifier corresponding to the first logical channel and a mapping configuration indicated by the first backhaul configuration.

9. The method of claim 8, wherein the second backhaul configuration indicates a mapping between an ingress backhaul RLC channel identifier of an RLC channel at the DU of the parent node and an egress backhaul RLC channel identifier of an RLC channel at the MT of the parent node,
wherein the ingress backhaul RLC channel identifier is the same as the first backhaul RLC channel identifier corresponding to the first logical channel, and
wherein the egress backhaul RLC channel identifier is different from the backhaul RLC channel identifier of the first egress backhaul RLC channel.

10. The method of claim 8, wherein the second backhaul configuration indicates a mapping between an ingress backhaul RLC channel identifier of an RLC channel at the DU of the parent node and a second egress backhaul RLC channel identifier of an egress RLC channel at the MT of the parent node,
where the ingress backhaul RLC channel identifier is the same as the first backhaul RLC channel identifier corresponding to the first logical channel,
wherein the egress backhaul RLC channel identifier is the same as the backhaul RLC channel identifier of the first egress backhaul RLC channel,
wherein the first egress backhaul RLC channel is configured at the MT of the parent node by the CU of the first IAB donor, and
wherein the second egress backhaul RLC channel is configured at the MT of the parent node by CU of the second IAB donor.

11. A method of wireless communication performed by a child node, comprising:
configuring a first backhaul radio link control (RLC) channel with a first logical channel identifier at a mobile termination function (MT) of the child node,
wherein the first backhaul RLC channel is configured based at least in part on a request received from a central unit (CU) of a first integrated access and backhaul (IAB) donor;
configuring a second backhaul RLC channel with a second logical channel identifier at the MT of the child node,
wherein the second backhaul RLC channel is configured based at least in part on a request received from a CU of a second IAB donor, and
wherein the first logical channel identifier is different from the second logical channel identifier;
receiving a packet at the MT of the child node, the packet including either the first logical channel identifier or the second logical channel identifier; and
processing the packet according to:
a first backhaul configuration, received from the CU of the first IAB donor, based at least in part on the packet including the first logical channel identifier, or
a second backhaul configuration, received from the CU of the second IAB donor, based at least in part on the packet including the second logical channel identifier.

12. The method of claim 11, wherein the MT of the child node is radio resource control connected to the CU of the first IAB donor and to the CU of the second IAB donor.

13. The method of claim 11, wherein the MT of the child node comprises a first MT that is radio resource control (RRC) connected to the CU of the first IAB donor and a second MT that is RRC connected to the CU of the second IAB donor.

14. The method of claim 11, wherein the child node has a first signaling connection to the CU of the first IAB donor and has a second signaling connection to the CU of the second IAB donor, and wherein at least one of the first signaling connection or the second signaling connection is a radio resource control (RRC) connection or a connection over an F1 interface.

15. The method of claim 11, wherein a backhaul RLC channel identifier of the first backhaul RLC channel matches a backhaul RLC channel identifier of the second backhaul RLC channel.

16. The method of claim 11, wherein at least one of the first logical channel identifier or the second logical channel identifier is an extended logical channel identifier.

17. The method of claim 11, wherein processing the packet according to the first backhaul configuration comprises forwarding the packet to higher layer processing based at least in part on the packet carrying an address that matches an address indicated by the first backhaul configuration, and wherein the second backhaul configuration indicates a different address than the address indicated by the first backhaul configuration.

18. The method of claim 11, wherein processing the packet according to the first backhaul configuration comprises forwarding the packet on an egress link to another node based at least in part on the packet carrying an address that is different from an address indicated by the first backhaul configuration.

19. The method of claim 11, wherein processing the packet according to the first backhaul configuration comprises forwarding the packet on a first path based at least in part on a routing identifier carried in the packet and a routing configuration indicated by the first backhaul configuration, and wherein the second backhaul configuration indicates a second path for the routing identifier carried in the packet.

20. The method of claim 11, wherein processing the packet according to the first backhaul configuration comprises mapping the packet to a first egress backhaul RLC channel at a distributed unit (DU) of the child node based at least in part on a first backhaul RLC channel identifier corresponding to the first logical channel and a mapping configuration indicated by the first backhaul configuration.

21. The method of claim 20, wherein the second backhaul configuration indicates a mapping between an ingress backhaul RLC channel identifier of an RLC channel at the MT of the child node and an egress backhaul RLC channel identifier of an RLC channel at the DU of the child node,
wherein the ingress backhaul RLC channel identifier is the same as the first backhaul RLC channel identifier corresponding to the first logical channel, and
wherein the egress backhaul RLC channel identifier is different from the backhaul RLC channel identifier of the first egress backhaul RLC channel.

22. The method of claim 20, wherein the second backhaul configuration indicates a mapping between an ingress backhaul RLC channel identifier of an RLC channel at the MT of the child node and an egress backhaul RLC channel identifier of a second egress RLC channel at the DU of the child node,
where the ingress backhaul RLC channel identifier is the same as the first backhaul RLC channel identifier corresponding to the first logical channel, wherein the egress backhaul RLC channel identifier is the same as the backhaul RLC channel identifier of the first egress backhaul RLC channel, wherein the first egress backhaul RLC channel is configured at the DU of the child node by the CU of the first IAB donor, and wherein the second egress backhaul RLC channel is configured at the DU of the child node by CU of the second IAB donor.

23. A parent node for wireless communication, comprising:

a memory; and one or more processors coupled to the memory, the memory and the one or more processors configured to:
configure a first backhaul radio link control (RLC) channel at a distributed unit (DU) of the parent node based at least in part on a request received from a central unit (CU) of a first integrated access and backhaul (IAB) donor;
configure a second backhaul RLC channel at the DU of the parent node based at least in part on a request received from a CU of a second IAB donor;
select a first logical channel identifier for the first backhaul RLC channel based at least in part on the configuring of the first backhaul RLC channel;
select a second logical channel identifier for the second backhaul RLC channel based at least in part on the configuring of the second backhaul RLC channel, wherein the second logical channel identifier is different from the first logical channel identifier;
provide the first logical channel identifier to the CU of the first IAB donor;
provide the second logical channel identifier to the CU of the second IAB donor;
receive a packet at the DU of the parent node, the packet including either the first logical channel identifier or the second logical channel identifier; and
process the packet according to:
a first backhaul configuration, received from the CU of the first IAB donor, based at least in part on the packet including the first logical channel identifier, or
a second backhaul configuration, received from the CU of the second IAB donor, based at least in part on the packet including the second logical channel identifier.

24. The parent node of claim 23, wherein:
the DU of the parent node is a DU of an IAB node; or
the DU of the parent node is a DU of an IAB donor.

25. The parent node of claim 23, wherein the parent node has a first signaling connection to the CU of the first IAB donor and has a second signaling connection to the CU of the second IAB donor, and wherein at least one of the first signaling connection or the second signaling connection is a radio resource control (RRC) connection or a connection over an F1 interface.

26. The parent node of claim 23, wherein a backhaul RLC channel identifier of the first backhaul RLC channel matches a backhaul RLC channel identifier of the second backhaul RLC channel.

27. A child node for wireless communication, comprising:
a memory; and
one or more processors coupled to the memory, the memory and the one or more processors configured to:
configure a first backhaul radio link control (RLC) channel with a first logical channel identifier at a mobile termination function (MT) of the child node, wherein the first backhaul RLC channel is configured based at least in part on a request received from a central unit (CU) of a first integrated access and backhaul (IAB) donor;
configure a second backhaul RLC channel with a second logical channel identifier at the MT of the child node,
wherein the second backhaul RLC channel is configured based at least in part on a request received from a CU of a second IAB donor, and
wherein the first logical channel identifier is different from the second logical channel identifier;
receive a packet at the MT of the child node, the packet including either the first logical channel identifier or the second logical channel identifier; and
process the packet according to:
a first backhaul configuration, received from the CU of the first IAB donor, based at least in part on the packet including the first logical channel identifier, or
a second backhaul configuration, received from the CU of the second IAB donor, based at least in part on the packet including the second logical channel identifier.

28. The child node of claim 27, wherein the MT of the child node is radio resource control connected to the CU of the first IAB donor and to the CU of the second IAB donor.

29. The child node of claim 27, wherein the MT of the child node comprises a first MT that is radio resource control (RRC) connected to the CU of the first IAB donor and a second MT that is RRC connected to the CU of the second IAB donor.

30. The child node of claim 27, wherein the child node has a first signaling connection to the CU of the first IAB donor and has a second signaling connection to the CU of the second IAB donor, and wherein at least one of the first signaling connection or the second signaling connection is a radio resource control (RRC) connection or a connection over an F1 interface.

* * * * *